US008543629B2

(12) United States Patent
Subrahmanyam et al.

(10) Patent No.: US 8,543,629 B2
(45) Date of Patent: Sep. 24, 2013

(54) IFFT PROCESSING IN WIRELESS COMMUNICATIONS

(75) Inventors: Jai N. Subrahmanyam, Santa Clara, CA (US); Chinnappa K. Ganapathy, San Diego, CA (US); Durk L. Van Veen, Santee, CA (US); Jinxia Bai, San Diego, CA (US); Kevin S. Cousineau, Ramona, CA (US); Seokyong Oh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1426 days.

(21) Appl. No.: 11/612,455

(22) Filed: Dec. 18, 2006

(65) Prior Publication Data

US 2008/0040412 A1  Feb. 14, 2008

Related U.S. Application Data

(60) Provisional application No. 60/789,445, filed on Apr. 4, 2006.

(51) Int. Cl.
*G06F 17/14* (2006.01)

(52) U.S. Cl.
USPC .......................................... 708/404; 708/400

(58) Field of Classification Search
None
See application file for complete search history.

(56) References Cited

U.S. PATENT DOCUMENTS

| 5,987,005 | A | 11/1999 | Fertner et al. |
| 6,122,703 | A | 9/2000 | Nasserbakht |
| 6,401,162 | B1 * | 6/2002 | Nasserbakht ..................... 711/5 |
| 6,570,912 | B1 | 5/2003 | Mirfakhraei |
| 7,200,799 | B2 | 4/2007 | Wang et al. |
| 7,555,512 | B2 | 6/2009 | Chen et al. |
| 7,561,511 | B1 | 7/2009 | Kumar et al. |
| 2002/0049581 | A1 | 4/2002 | Liu |
| 2003/0135813 | A1 * | 7/2003 | Greenberg et al. ........... 714/796 |
| 2004/0034677 | A1 | 2/2004 | Davey et al. |
| 2005/0038842 | A1 * | 2/2005 | Stoye ............................. 708/306 |
| 2005/0233710 | A1 | 10/2005 | Lakkis et al. |
| 2007/0237246 | A1 | 10/2007 | Lim et al. |
| 2008/0040413 | A1 | 2/2008 | Subrahmanyam et al. |

FOREIGN PATENT DOCUMENTS

| DE | 4319216 | 12/1994 |
| EP | 1130868 | 9/2001 |
| JP | 10327123 A | 12/1998 |

(Continued)

OTHER PUBLICATIONS

Pham G. N. at al., "A high throughput, asynchronous, dual port FIFO memory implemented tri ASIC technology", Conference Proceedings Article, Sep. 25, 1989, pp. P3-1, XP010092548.

(Continued)

*Primary Examiner* — Michael D Yaary
(74) *Attorney, Agent, or Firm* — Fulbright & Jaworski LLP

(57) ABSTRACT

Techniques for perforating IFFT pipelining are described. In some aspects, the pipelining is achieved with a processing system having a memory with a first, second and third sections, an encoder configured to process data in each of the first, second and third memory sections in a round robin fashion, an IFFT configured to process the encoded data in each of the first, second, and third sections in a round robin fashion, and a post-processor configured to process the IFFT processed data in each of the first, second and third memory sections in a round robin fashion.

33 Claims, 13 Drawing Sheets

(56) References Cited

FOREIGN PATENT DOCUMENTS

| | | |
|---|---|---|
| JP | 11008601 A | 1/1999 |
| JP | 11284596 | 10/1999 |
| JP | 2000278238 A | 10/2000 |
| JP | 2004064466 A | 2/2004 |
| JP | 2004312682 A | 11/2004 |
| JP | 2005532741 A | 10/2005 |
| JP | 2005535223 A | 11/2005 |
| JP | 2005338035 A | 12/2005 |
| JP | 2005341458 A | 12/2005 |
| JP | 2006050190 A | 2/2006 |
| JP | 2006067118 A | 3/2006 |
| JP | 2007088779 A | 4/2007 |
| JP | 2009533004 | 9/2009 |
| WO | 0030034 | 5/2000 |
| WO | WO2004006426 | 1/2004 |
| WO | WO2004013999 | 2/2004 |
| WO | 04-107737 | 12/2004 |
| WO | WO2007115328 | 10/2007 |

OTHER PUBLICATIONS

Internationai Search Report—PCT/US07/066001, International Search Authority—European Patent Office—Oct. 10, 2007.

Jain, R. K. et al., "System-on-chip design of a four-port ADSL-LITE data DSP", Proceedings of the 2001 IEEE International Symposium on Circuits and Systems, vol. 1 of 5, May 6-9, 2001 pp. 242-245, XP010541838.

International Search Report—PCT/US2007/066003, International Search Authority—European Patent Office, Oct. 10, 2007.

Jose D P Rolim, Parallel and Distributed Processing, 2000, Springer, pp. 908-909.

Wang, et al., Turbo Detection and decoding for Single-Carrier Block Transmission Systems, 2004, IEEE, pp. 1163-1167.

Written opinion—PCT/US2007/066003, International Search Authority—European Patent Office—Oct. 10, 2007.

Altera Inc., "Accelerating WiMAX System Design with FPGAs", WP-FPGA 102204-1.0, 2004, pp. 1-15.

Chang, et al., "Transmitter Architecture for Pulsed OFDM", Department of Electrical and Computer Engineering, 2004, pp. 1-4.

Hanli Z., et al., "A 32 mW Self Contained ODFM Receiver ASIC for Mobile Cellular Applications," Symposium on VLSI Circuits Digest of Technical Papers, IEEE, 2004, pp. 148-151.

Xilinx Inc., "High-Performance 1024-Point Complex FFT/IFFT V2.0", 2000 Xilinx, Inc. All rights reserved. (version 1.0), pp. 1-19.

* cited by examiner

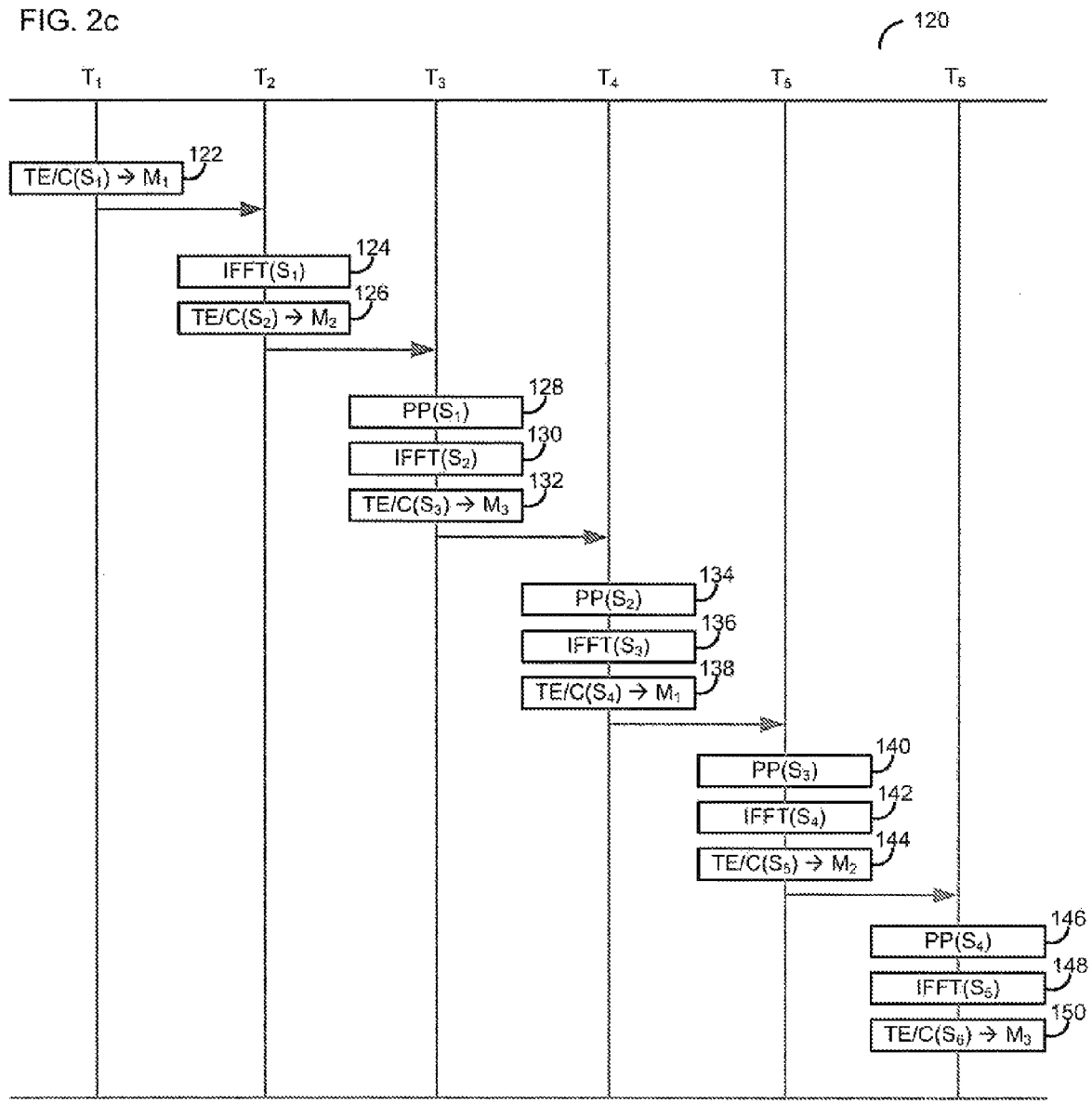

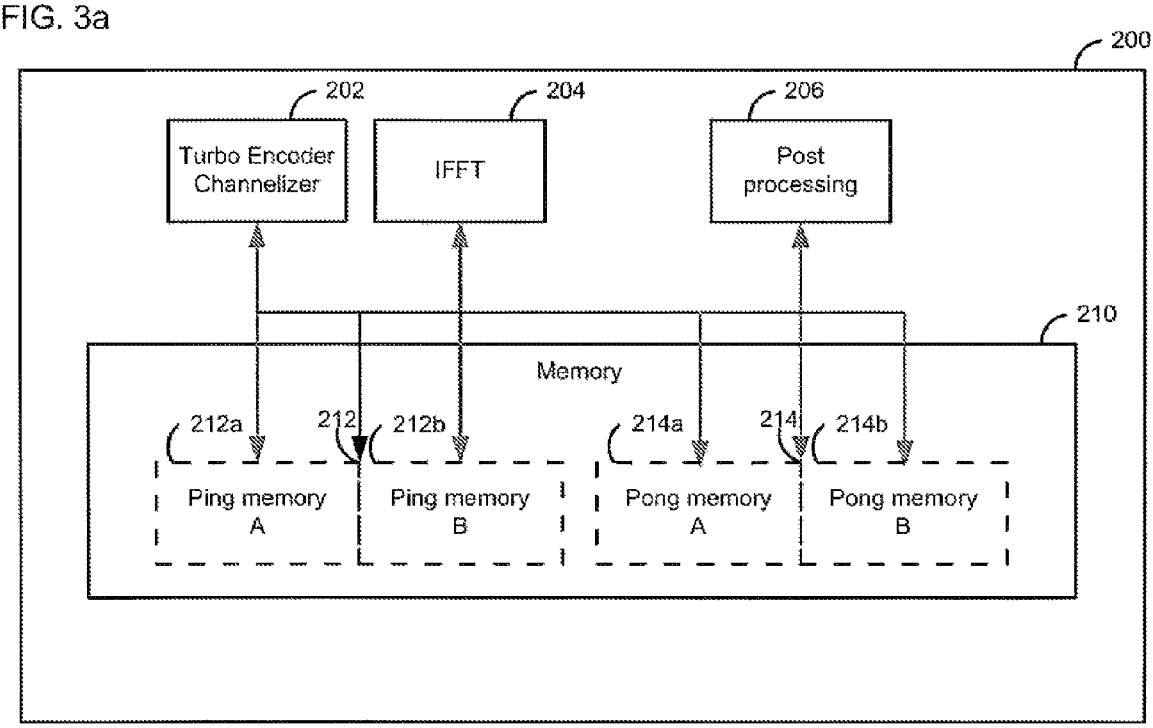

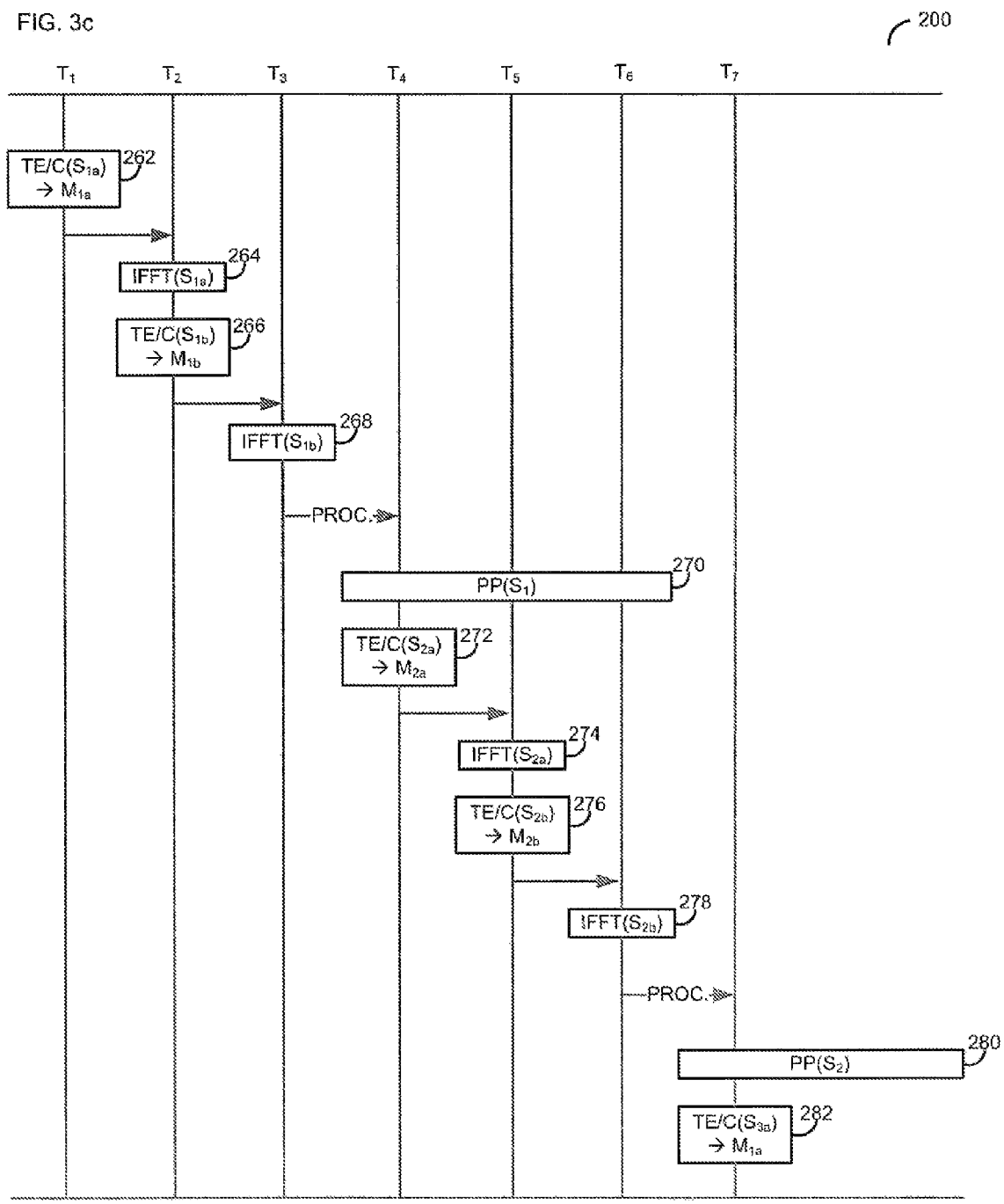

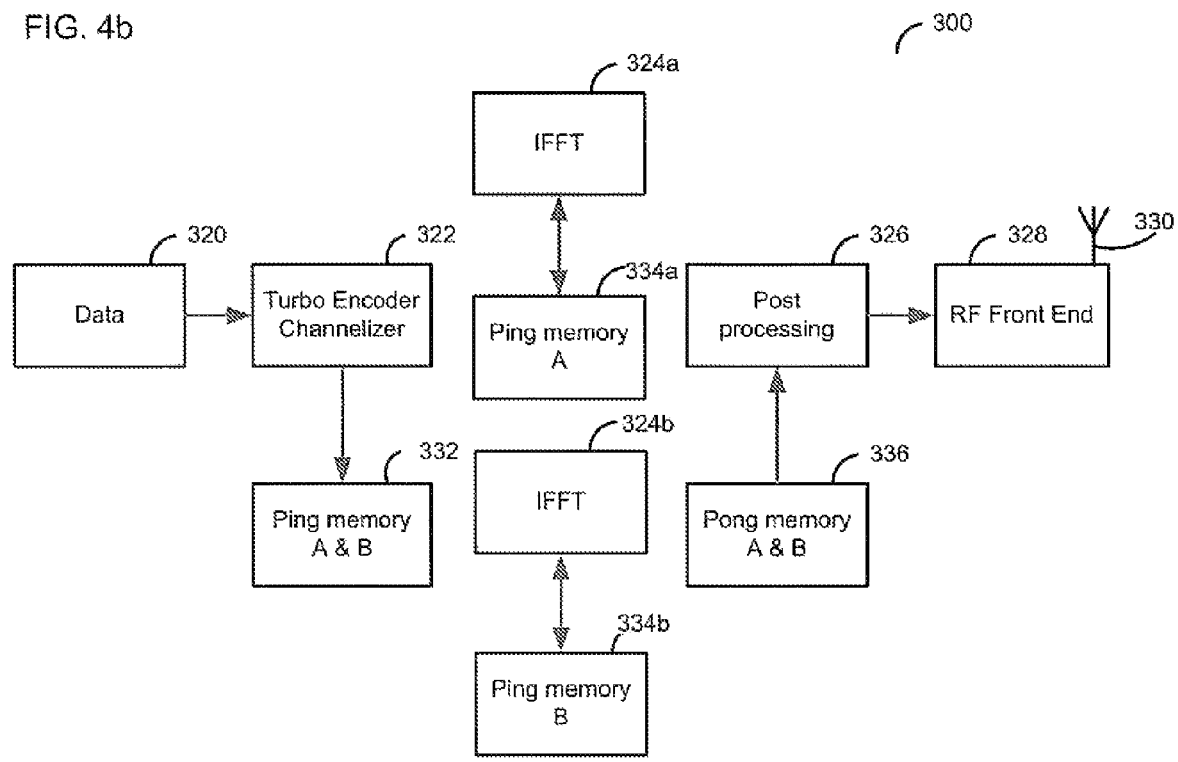
FIG. 4b
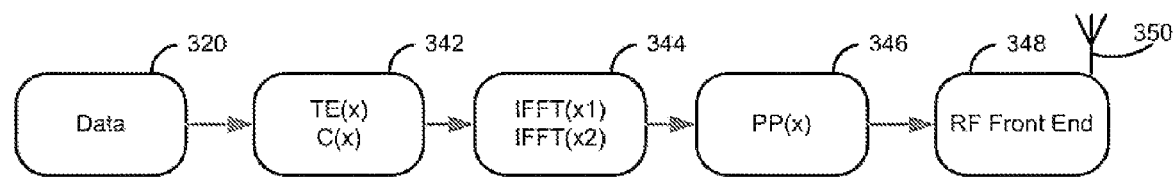

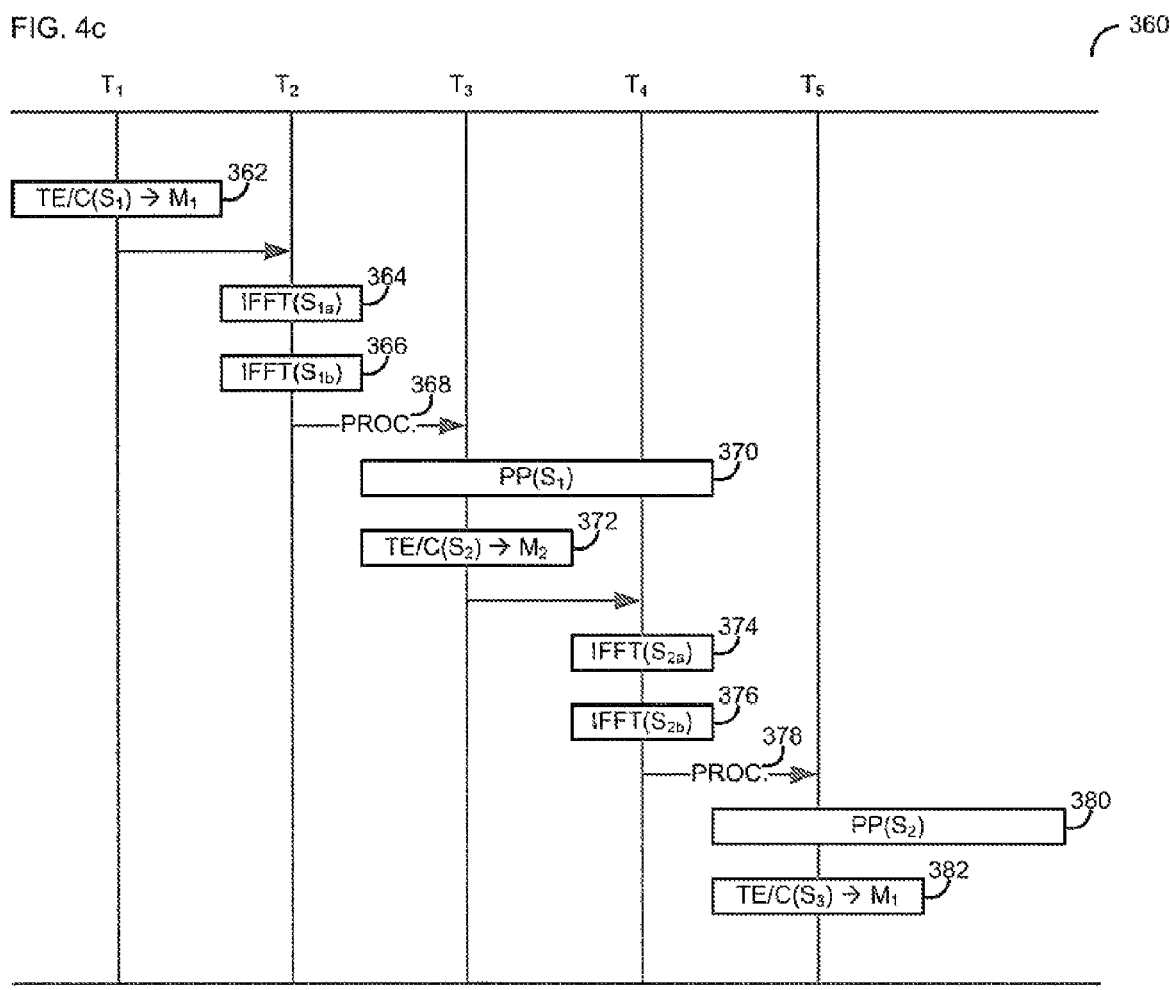

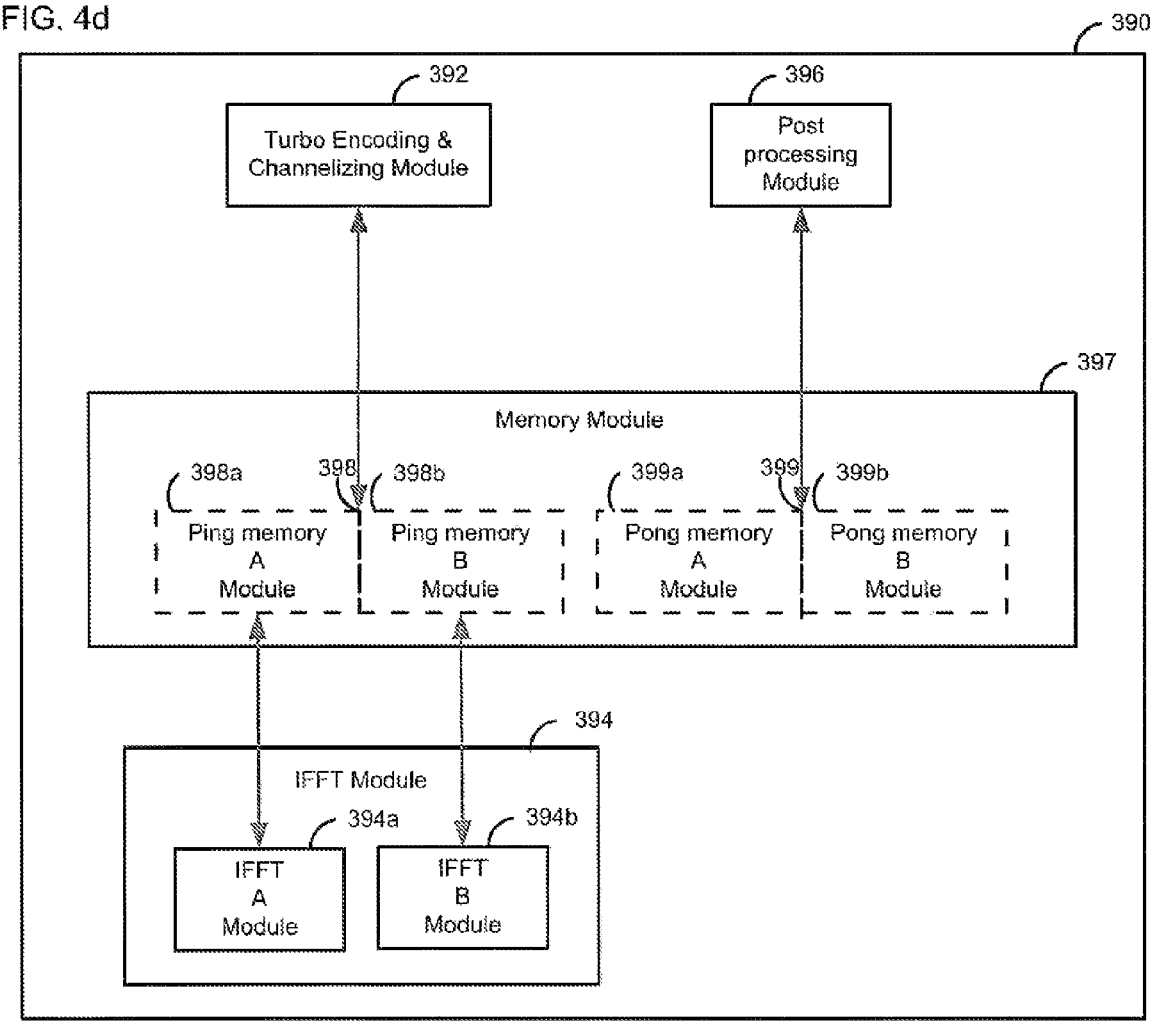

IFFT PROCESSING IN WIRELESS COMMUNICATIONS

CLAIM OF PRIORITY UNDER 35 U.S.C. §119

The present Application for Patent claims priority to Provisional Application, No. 60/789,445 entitled "PIPELINING FOR HIGHER ORDER IFFT IMPLEMENTATIONS" filed Apr. 4, 2006, and assigned to the assignee hereof and hereby expressly incorporated by reference herein.

BACKGROUND

I. Field

The present disclosure relates generally to telecommunications, and more specifically, to inverse fast Fourier transform (IFFT) processing techniques in wireless communications.

II. Background

In a typical telecommunications system, a transmitter typically processes (e.g., encodes and modulates) data and generates a radio frequency modulated signal that is more suitable for transmission. The transmitter then transmits the RF modulated signal to a receiver.

Various modulation techniques are used to process the data symbols for transmission including one technique called Orthogonal frequency-division multiplexing (OFDM). In OFDM modulation, the symbol is turbo encoded, channelized, and IFFT processed prior to the post-processor transmission. However, in certain instances or situations, the pre-transmission processing (turbo encoding, channelizing, IFFT) can take longer than the post-processor transmission. This creates undesirable gaps in the transmission while the post-processor waits for the pre-transmission processing to complete. Depending on the implementation, the pre-processing transmission may be forced to terminate prematurely.

There is therefore a need in the art for techniques to eliminate these gaps in an efficient and cost-effective manner.

SUMMARY

Techniques for efficiently performing IFFT processing are described herein.

In some aspects, the IFFT pipeline is achieved with a processing system having a processing system having a memory having first, second and third sections, an encoder configured to process data in each of the first, second and third memory sections in a round robin fashion, an IFFT configured to process the encoded data in each of the first, second, and third sections in a round robin fashion, and a post-processor configured to process the IFFT processed data in each of the first, second and third memory sections in a round robin fashion. The processing system may have at least one multipurpose processor configured to implement at least one of the encoder, the IFFT, and the post processor.

In other aspects, the IFFT pipeline is achieved with a processing system having a memory having first, second and third sections, an encoder configured to process data in each of the first, second and third memory sections, an IFFT configured to process the encoded data in the second memory section while the encoder is processing the data in the third memory section, and a post processor configured to process the IFFT processed data in the first memory section while the IFFT is processing the encoded data in the second memory section.

In some aspects, the processing system may have a memory having a fourth section, an encoder configured to process data in each of the first, second, third, and fourth memory sections in a round robin fashion, an IFFT configured to process the encoded data in each of the first, second, third, and fourth sections, and a post-processor configured to process the IFFT processed data in each of the first, second, third, and fourth memory sections. The processing system may have at least one multipurpose processor configured to implement at least one of the encoder, the IFFT, and the post processor. The post-processor may process the first and second memory sections as a first combined memory section, and the third and fourth memory sections as a second combined memory section. The encoder may process the first and second memory sections as a first combined memory section, and the third and fourth memory sections as a second combined memory section. The IFFT may process the first and second memory sections as a first combined memory section, and the third and fourth memory sections as a second combined memory section, and the IFFT sub-processes the memory sections of the combined memory sections concurrently. The encoder, the IFFT, and the post-processor may operate at the same clock speed.

In yet other aspects, the IFFT pipeline is achieved with a processor coupled to a memory having first, second and third sections, the processor configured to encode data in each of the first, second and third memory sections in a round robin fashion, to IFFT process the encoded data in each of the first, second, and third sections in a round robin fashion, and to post-processor process the IFFT processed data in each of the first, second and third memory sections in a round robin fashion. The memory may have an additional fourth memory section with the processor configured to encode data in each of the first, second, third, and fourth memory sections in a round robin fashion, to IFFT process the encoded data in each of the first, second, third, and fourth sections, and to post-processor process the IFFT processed data in each of the first, second, third, and fourth memory sections. The post-processor may process the first and second memory sections as a first combined memory section, and the third and fourth memory sections as a second combined memory section. The encoder may process the first and second memory sections as a first combined memory section, and the third and fourth memory sections as a second combined memory section. The IFFT may process the first and second memory sections as a first combined memory section and the third and fourth memory sections as a second combined memory section, with the IFFT sub-processing the memory sections of the combined memory sections concurrently. The encoder, the IFFT, and the post-processor may operate at the same clock speed.

In some aspects, the IFFT pipeline may be achieved by providing a memory having first, second and third sections, encoding data in each of the first, second and third memory sections in a round robin fashion, IFFT processing the encoded data in each of the first, second, and third sections in a round robin fashion, and post-processor processing the IFFT processed data in each of the first, second and third memory sections in a round robin fashion. The IFFT pipeline may be achieved by providing with a memory may have a fourth section, encoding data in each of the first, second, third, and fourth memory sections in a round robin fashion, IFFT processing the encoded data in each of the first, second, third, and fourth sections, and post-processor processing the IFFT processed data in each of the first, second, third, and fourth memory sections. The post-processor processing may process the first and second memory sections as a first combined memory section, and processing the third and fourth memory sections as a second combined memory section. The encoding may process the first and second memory sections as a first combined memory section, and the third and fourth memory sections as a second combined memory section. The IFFT processing may process the first and second memory sections as a first combined memory section and the third and fourth memory sections as a second combined memory section, IFFT sub-processing the memory sections of the combined memory sections concurrently. The encoding, IFFT processing, and post-processor processing may be processed at the same clock speed.

In other aspects, the IFFT pipeline is achieved with a processing system having a means for providing a memory having first, second, and third sections, a means for encoding data in each of the first, second and third memory sections in a round robin fashion, a means for IFFT processing the encoded data in each of the first, second, and third sections in a round robin fashion, and a means for post-processor processing the IFFT processed data in each of the first, second and third memory sections in a round robin fashion. The processing system may include a means for providing a memory having a fourth section, a means for encoding data in each of the first, second, third, and fourth memory sections in a round robin fashion, a means for IFFT processing the encoded data in each of the first, second, third, and fourth sections, and a means for post-processor processing the IFFT processed data in each of the first, second, third, and fourth memory sections. The means for post-processor processing the first and second memory sections may be as a first combined memory section, and the means for post-processor processing the third and fourth memory sections may be as a second combined memory section. The means for encoding the first and second memory sections may be as a first combined memory section, and a means for encoding the third and fourth memory sections may be as a second combined memory section. The means for IFFT processing the first and second memory sections may be as a first combined memory section and a means for IFFT processing the third and fourth memory sections may be as a second combined memory section, the means for IFFT sub-processing the memory sections of the combined memory sections occur concurrently. The means for encoding, IFFT processing, and post-processor processing may be at the same clock speed.

In yet other aspects, the IFFT pipeline is achieved with a computer readable medium having first, second and third sections, the computer readable medium encoded with a computer program to encode data in each of the first, second and third memory sections in a round robin fashion, IFFT process the encoded data in each of the first, second, and third sections in a round robin fashion, and post-processor process the IFFT processed data in each of the first, second and third memory sections in a round robin fashion. The medium may further have a fourth section where the computer readable medium is encoded with a computer program to encode data in each of the first, second, third, and fourth memory sections in a round robin fashion, IFFT process the encoded data in each of the first, second, third, and fourth sections, and post-processor process the IFFT processed data in each of the first, second, third, and fourth memory sections.

The post-processor processing of the first and second memory sections may be as a first combined memory section, and the third and fourth memory sections as a second combined memory section. The encoding of the first and second memory sections may be as a first combined memory section, and the third and fourth memory sections as a second combined memory section. The IFFT processing of the first and second memory sections may be as a first combined memory section and the third and fourth memory sections as a second combined memory section, the IFFT sub-processing the memory sections of the combined memory sections concurrently. The encoding, IFFT processing, and post-processor processing may be at the same clock speed.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 2c is a time-process diagram for a telecommunications IFFT processing system.

FIG. 3a is a block diagram illustrating a telecommunications IFFT processing system.

FIG. 3c is a time-process diagram for a telecommunications IFFT processing system.

FIG. 4b is a block diagram illustrating information flow in a telecommunications IFFT processing system.

FIG. 4c is a time-process diagram for a telecommunications IFFT processing system.

FIG. 4d is a block diagram illustrating a telecommunications IFFT processing system.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The processing techniques described herein may be used for various wireless communication systems such as cellular systems, broadcast systems, wireless local area network (WLAN) systems, and so on. The cellular systems may be Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and so on. The broadcast systems may be MediaFLO systems, Digital Video Broadcasting for Handhelds (DVB-H) systems, Integrated Services Digital Broadcasting for Terrestrial Television Broadcasting (ISDB-T) systems, and so on. The WLAN systems may be IEEE 802.11 systems, Wi-Fi systems, and so on. These various systems are known in the art.

The processing techniques described herein may be used for systems with a single subcarrier as well as systems with multiple subcarriers. Multiple subcarriers may be obtained with OFDM, SC-FDMA, or some other modulation technique. OFDM and SC-FDMA partition a frequency band (e.g., the system bandwidth) into multiple orthogonal subcarriers, which are also called tones, bins, and so on. Each subcarrier may be modulated with data. In general, modulation symbols are sent on the subcarriers in the frequency domain with OFDM and in the time domain with SC-FDMA. OFDM is used in various systems such as MediaFLO, DVB-H and ISDB-T broadcast systems, IEEE 802.11a/g WLAN systems, and some cellular systems. Certain aspects and embodiments of the processing techniques are described below for a broadcast system that uses OFDM, e.g., a MediaFLO system.

Figure 1:
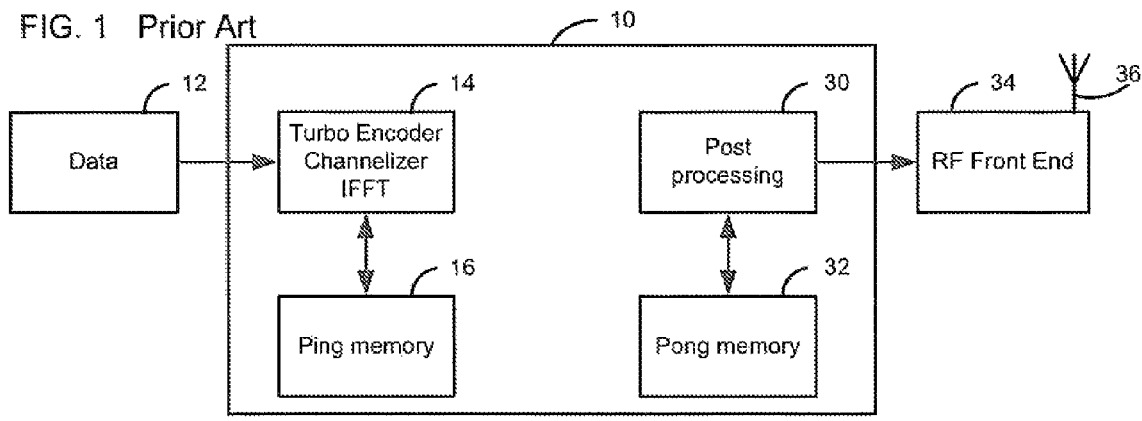
FIG. 1 is a block diagram illustrating information flow in a typical telecommunications IFFT processing system.

FIG. 1 shows a block diagram of a typical transmission processing system 10, data 12, and a RF transmitter 34. The processing system 10 may be part of a base station or part of an access terminal. The processing system 10 may be implemented as part of an OFDM broadcast system, such as the MediaFLO system. A base station is typically a fixed station and may also be called a base transceiver system (BTS), an access paint, a Node B, and so on. A terminal may be fixed or mobile and may also be called a mobile station, a user equipment, a mobile equipment, an access terminal, and so on. A terminal may be a cellular phone, a personal digital assistant (PDA), a wireless modem, a wireless communication device, a handheld device, a subscriber unit, and so on.

The processing system 10 receives data 12 and prepares the data for transmission by the RF transmitter 34. In preparing the data for transmission, the processing system 10 employs one or more engines for pre-transmission processing 14, one or more engines for post-processing transmission 30, and two memory sections 16 and 32. The data 12 is typically telecommunication symbols but may also be called signals, exchange information, packets, and so on. The engines 14, 30 are typically specialized integrated circuit (IC) processors designed for the specific task but may also be segments of software code that performs specific tasks and executed on a multi-purpose processor, a single IC system, a field-programmable gate array, and so on. A memory sections may be a single storage module, a portion of a storage module, a related grouping of multiple storage modules, and so on. The memory in the describe systems are typically dual port memories but may also be single port memories. The memory sections may store symbols, interlaces, other embodiments of symbols, and so on. The RF transmitter 34 is typically an electronic device that, with the aid of an antenna 36, propagates an electromagnetic signal.

The data 12 is first pre-transmission processed 14. The pre-transmission processing engine 14 receives the data 12, turbo encodes the data 12, channelizes the encoded data, and processes an IFFT on the encoded and channelized data. During and after the pre-transmission processing 14, the data 12 is stored on a first memory section called a ping memory 16.

Throughout this specification, the process of turbo encoding and channelizing may be reference collectively as encoding. The turbo encoding engine and the channelizer (engine) may be referenced collectively as an encoding engine(s).

While data 12 is being processed by the pre-transmission processing engine 14, the post-processing engine 30 is processing a symbol of data that was previously pre-transmission processed and currently stored on a second memory section call a pong memory 32. The post-processing engine 30 retrieves the pre-transmission processed data (e.g. turbo encoded/channelized/IFFT) from the pong memory 32, executes any necessary preparations to the data required for transmission, and transfers the data to the RF Front End 43 for transmission at the antenna 36.

However, in certain instances, the time required for the pre-transmission processing 14 is longer than the time required to complete the post-processing and data transmission by the post-processing engine 30. For example, if the broadcast system were the MediaFLO system and the data were an 8K symbol, in the worst-case scenario, the pre-transmission processing would require 39,382 clock cycles (clocks) while the post-processing would require 37,000 clock cycles. This leaves the pre-transmission processor 2,382 clock cycles over budget. Depending on the implementation, this gap can result in the pre-processor not completing the entire IFFT task or the post-processor 30 not having data to transmit.

Figure 2A:
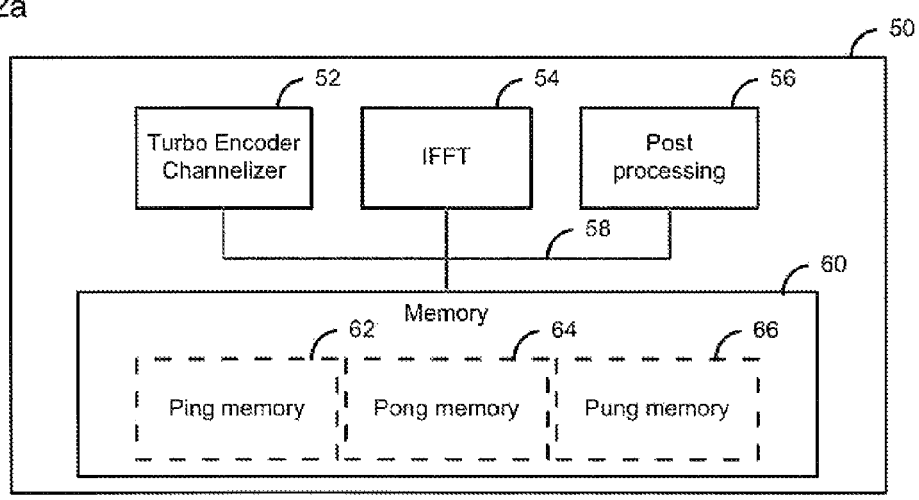
FIG. 2a is a block diagram illustrating a telecommunications IFFT processing system.

FIG. 2a shows a block diagram design of an exemplary transmission processing system 50 that resolves the transmission/processing gap-clock budgeting issue. The processing system 50 includes an encoder engine 52, an IFFT processing engine 54, a post-processing engine 56, and a memory 60 connected to the engines 52, 54, 56. The memory 60 includes three memory sections (sectors), a ping memory 62, a pong memory 64, and a pung memory 66. Each of the engines 52, 54, 56 has access to each of the memory sections 62, 64, 66. Although the engines may access any of the memory sections 62, 64, 66 at any time, typically, the engines processes data at a single memory section until the engine completes its processing. Upon completion, the engine begins processing data at a different memory sector.

Figure 2B:
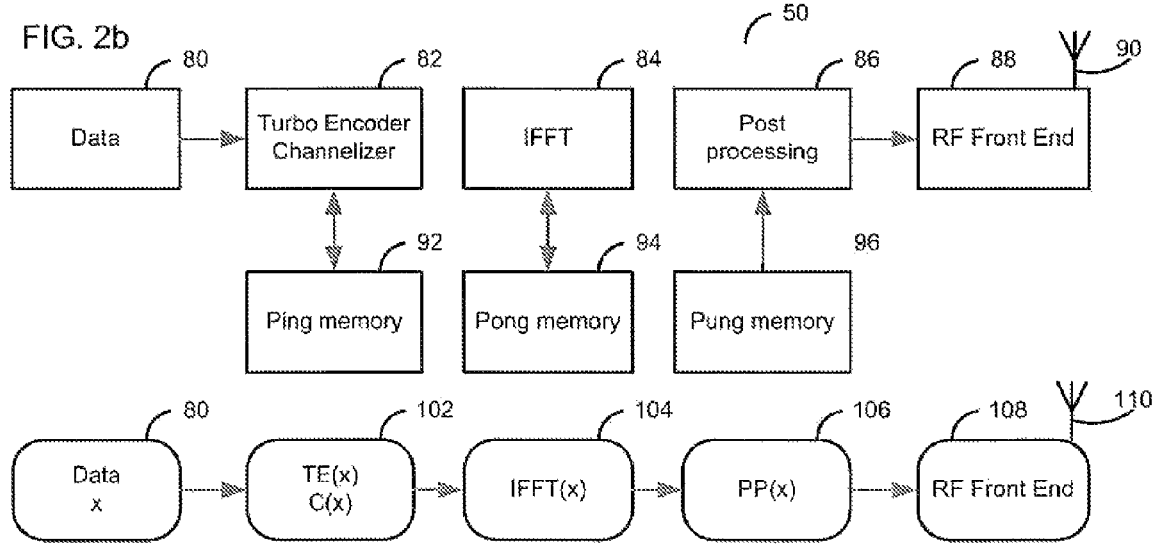
FIG. 2b is a block diagram illustrating information flow in a telecommunications IFFT processing system.

FIG. 2b shows a time-instant snapshot of the data flow for the transmission processing system 50. From a functional process, the data 80 is first encoded 102. An IFFT 104 is carried out on the encoded data, the results of which are sent to the post-processing engine for post-processing 106. The post-processing engine transfers 106 the post-processed data to the RF Front End 108 for transmission over a broadcast antenna 110.

Taking a snapshot of the data flow, the encoder engine 82 receives data 80 such as 8K of information. The 8K of data may be an entire symbol or sufficient interlaces of data to complete a constellation map (as processed by the channelizer). The encoder engine 82 then encodes the data, and stores the encoded data in the first memory sector such as the ping memory 92. In the MediaFLO system, the data is a symbol in the frequency domain. The turbo encoder 82 encodes and bit interleaves the frequency domain data. The channelizer loads the tones onto specific frequencies based on a constellation map (if one exists), a process also known as symbol mounting.

In MediaFLO, the encoder processes data eight (8) interlaces at a time although there can other number of interlaces in other implementations. The interlaces process a set of 4096 tones, each tone being one OFDM symbol. Each tone carries one bit (or modulation symbol) of information. After the turbo encoder processes the eight interlaces, the output is grouped together and mapped onto a constellation map to produce a modulation symbol. The modulation symbol is ready for the IFFT processing.

In terms of clocks, during this encoding process, the encoder 82 receives a symbol $S_1$, writes the symbol to the system's embedded random access memory (eRAM), and performs a cyclical redundancy checking (CRC) on the written memory. This process requires 131 clock cycles. After the writing, the encoder begins turbo encoding the symbol—a process that requires 500 clock cycles (1000 bits/2 bits/cycle). After encoding, the encoder flushes the clocks (12 clock cycles). Up to this point, the process has required 643 clocks (131+500+12=643).

At this point, the number of clocks required depends on the data scenario. The encoder may process one of a number of quadrature amplitude modulations (QAM) and quadrature phase shift keying (QPSK) modes. It is notable that the QPSK modes consume the same number of clocks as QAM due to memory packing.

If the scenario is QAM ⅓, transferring data from the bit interleaver to the packet memory requires 750 clocks (3000/4=750), and giving a total of 1393 clocks to process a QAM ⅓ packet (131+500+12+750=1393). Since the number of interlaces per QAM ⅓ packet is 1.5, 928.667 clocks are required per QAM ⅓ interlace (1393/1.5=928.667).

If the scenario is QAM ⅔, transferring data from the bit interleaver to the packet memory requires 375 clocks (1500/4=375), and giving a total of 1018 clocks to process a QAM ⅔ packet (131+500+12+375=1018). Since the number of interlaces per QAM ⅔ packet is 0.75, 1357.333 clocks are required per QAM ⅔ interlace (1018/0.75=1357.333).

From this, QAM ⅔ represents the worst case situation. Since it takes 2048 clocks to transfer an interlace from the packet memory to the reorder memory, and since the amount of time to write an interlace into the packet memory is at most 1357.333, these QAM reads can be hidden within the time it takes to process a packet memory bank. However, this is not representative of the worst case.

The worst case scenario occurs when the instructions require stacking two (2) QAM ⅔ turbo groups on top of each with a third QAM ⅔ turbo group that lies horizontally. The three (3) QAM ⅔ turbo groups take a total of seven (7) slots. Assume in this scenario there are some QAM ⅓ turbo groups scheduled for later symbols. In the worse case, when the turbo encoder 82 is reading the last entry of the ping memory of the first QAM ⅔ turbo group, the turbo encoding engine receives a request to process a QAM ⅓ packet. In this instance, the turbo encoder has to process the QAM ⅓ packet and a QAM ⅔ packet for the ping memory within the time it takes the system to process the pong portion of the memory. The amount of time required to process a QAM ⅔ packet is 1536 clocks (2048*0.75=1536). The amount of time required to process the QAM ⅓ packet and the QAM ⅔ packet is 2411 clocks (1393+1018=2411). In this Instance, the channelizer processing time has to be augmented by a stall time of 875 clocks (2411−1536=875), or 17.5 μs. Since there are two (2) QAM ⅔ turbo groups in the worst case, the total number of stall clocks is doubled to 1750 (875*2=1750).

After the interlace data are encoded, the channelizer processes the interlaces. The worst case situation for the channelizer is when it has to process one of the QAM modes. The channelizer requires 4 clocks to process a QAM symbol and 2048 clocks (4*512=2048) to write an interlace to the reorder memory. Since there are a maximum of seven (7) occupied interlaces in a data symbol in MediaFLO, the worst case number of clocks to process all data interlaces is 14,336 (7*4*512=14,336). The Pilot QPSK symbol requires two (2) clocks to process. Since there is one Pilot interlace in MediaFLO, the worst case number of clocks to process the Pilot interlace is 1024 (1*2*512)=1024). Lastly, transferring the interlace from the Reorder to the IFFT memory requires 512 clocks (8*64=512). This give a total of 15,872 clocks to channelize an OFDM symbol (14,366+1024+512=15,872).

In the worst case scenario, the total clocks to turbo encode and channelize an OFDM symbol is 17,622 (15,872+1,750=17.622).

While the encoder 82 is encoding the symbols 80, the IFFT engine 84 performs an IFFT on an encoded symbol stored in the second memory section 94 (pong memory). In the case of the 8K symbol, an 8K encoded symbol resides in the pong memory 94 at the start of the IFFT processing. The IFFT engine converts the data from the frequency domain into the time domain, and executes some minor processing before the IFFT-processed (IFFTed) data is written back into the pong memory 94. MediaFLO performs the 8K IFFT in two steps, performing a 4K IFFT on the even memory bank of the pong memory and performing a 4K IFFT on the odd memory bank of the pong memory.

In terms of clocks, during this IFFT process, each 4K IFFT require 10,880 clocks to complete processing. Since there are two 4K IFFTs (odd and even), the 8K IFFT processing requires 21,760 clocks.

While the encoder 82 and the IFFT engine 84 are processing their respective data, the post-processing engine 86 processes the IFFTed data stored in the third memory section 96 (pung memory). The post-processing engine retrieves the IFFTed data, prepares the information for RF transmission, and sends the data to the RF Front End 88 (and antenna 90) for transmission. In post-processing, the OFDM requires a cyclic prefix be added to the symbol. The post-processor engine 86 attaches the cyclic prefix to the symbol. The tail frame (512 symbols) is copied to the front of the symbol producing a cycling prefix. The linear convolution becomes a circular convolution. This is used by the remote receiver (not shown) to correct channel transmission errors.

In terms of clocks, the post-processing requires 37,000 clocks. There are 9,250 time domain samples per OFDM symbol. Each time domain sample requires four (4) clocks to generate I/Q values. From this, the total number of clocks required to generate the post-processor output is 37,000 (4*9,250=37,000).

In the two memory system described in FIG. 1, the encoding and the IFFT are executed sequentially in the same memory section resulting in 39,382 clocks. In this tri-memory (or tri-level) pipeline implementation, the encoder and the IFFT are processed on separate memory sections and therefore may execute concurrently. Since both the encoder (17,622 clocks) and the IFFT (21,760 clocks) require less time than the post-processing (37,000 clocks), the post-processing may process continuously without encountering any transmission/processing gaps. This tri-memory (or tri-level) pipelining techniques resolves the transmission/processing gap issue.

FIG. 2c is a exemplary time-process diagram for a telecommunications IFFT processing system 50. This tri-memory architecture can be implemented in multiple ways.

To illustrate the process and timing of the system 50, we assume the system 50 is not processing data at time period $T_0$ (not shown; denotes initial start state). The system starts at time period $T_1$ with the encoder processing a symbol $S_1$ to be stored in memory $M_1$. In this process, the encoder turbo encodes the interlaces, channelizes the symbol, and write the resulting $S_1$ back onto $M_1$. This process 122 is completed by the end of time period $T_1$.

At $T_2$, the IFFT engine processes $S_1$ (currently stored in $M_1$). This process 124 involves the IFFT engine reading $S_1$ from $M_1$, performing the IFFT, and writing the results back onto $M_1$. While process 124 is taking place, the encoder begins processing a symbol $S_2$ to be stored in memory $M_2$ (process 126). Much like in process 122, process 126 involves the encoder turbo encoding the interlaces (that constitute $S_2$), channelizing the $S_2$, and writing the resulting $S_2$ back onto $M_2$. Both processes 124, 126 are completed by the end of time period $T_2$.

At $T_3$, the post-processing engine (PP) processes $S_1$ (still stored its $M_1$). This process 128 includes reading the symbol $S_1$ from $M_1$, performing any necessary residual processing as described above, and initiating the symbol transmission process at the RF Front End. Also at $T_3$, the IFFT engine processes $S_2$ (currently stored in $M_2$). This process 130 involves the IFFT engine reading $S_2$ from $M_2$, performing the IFFT, and writing the results back onto $M_2$. While processes 128 and 130 are taking place, the encoder begins processing a symbol $S_3$ to be stored in memory $M_3$ (process 132). Much like in process 122, process 132 involves the encoder turbo encoding the interlaces (that constitute $S_3$), channelizing the $S_3$, and writing the resulting $S_3$, back onto $M_3$. All three processes 128, 130, 132 are completed by the end of time period $T_3$.

$T_4$, $T_5$, and $T_6$ illustrate what happens to a pipeline when the three memory sections have data in them and illustrates the round-robin concept of data processing. The term round-robin is used in several contexts and typically means that a number of things are taking turns at something. For example, the engines in the implementation illustrated by FIG. 2c are taking turns reading and writing to the three memory sections. Round-robin may also be other turn-taking implementations.

To continue with FIG. 2c, at $T_4$, symbol $S_1$ has completed processing in this pipeline. This took place in the previous step. $T_4$ begins with the post-processing engine (PP) processing $S_2$ (still stored in $M_2$). This process 134 includes reading the symbol $S_2$ from $M_2$, performing any necessary residual processing as described above, and initiating the symbol transmission process at the RF Front End. Also at $T_4$, the IFFT engine processes $S_3$ (currently stored in $M_3$). This process 136 involves the IFFT engine reading $S_3$ from $M_3$, performing the IFFT, and writing the results back onto $M_3$. While processes 134 and 136 are taking place, the encoder begins processing a symbol $S_4$ to be stored in memory $M_1$ (process 138). Much like in process 122, process 138 involves the encoder turbo encoding the interlaces (that constitute $S_4$), channelizing the $S_4$, and writing the resulting $S_4$ back onto $M_1$. All three processes 134, 136, 138 are completed by the end of time period $T_4$.

At $T_5$, symbol $S_2$ has completed processing in this pipeline. This took place in the previous step. $T_5$ begins with the post-processing engine (PP) processing $S_3$ (still stored in $M_3$). This process 140 includes reading the symbol $S_3$ from $M_3$, performing any necessary residual processing as described above, and initiating the symbol transmission process at the RF Front End. Also, at $T_5$, the IFFT engine processes $S_4$ (currently stored in $M_1$). This process 136 involves the IFFT engine reading $S_4$ from $M_1$, performing the IFFT, and writing the results back onto $M_1$. While processes 140 and 142 are taking place, the encoder begins processing a symbol $S_5$ to be stored in memory $M_2$ (process 144). Much like in process 122, process 144 involves the encoder turbo encoding the interlaces (that constitute $S_5$), channelizing the $S_5$, and writing the resulting $S_5$ back onto $M_2$. All three processes 140, 142, 144 are completed by the end of time period $T_5$.

At $T_6$, symbol $S_3$ has completed processing in this pipeline. This took place in the previous step. $T_6$ begins with the post-processing engine (PP) processing $S_4$ (still stored in $M_1$). This process 146 includes reading the symbol $S_4$ from $M_1$, performing any necessary residual processing as described above, and initiating the symbol transmission process at the RF Front End. Also at $T_6$, the IFFT engine processes $S_5$ (currently stored in $M_2$). This process 148 involves the IFFT engine reading $S_5$ from $M_2$, performing the IFFT, and writing the results back onto $M_2$. While processes 146 and 148 are taking place, the encoder begins processing a symbol $S_6$ to be stored in memory $M_3$ (process 150). Much like in process 122, process 150 involves the encoder turbo encoding the interlaces (that constitute $S_6$), channelizing the $S_6$, and writing the resulting $S_6$ back onto $M_3$. All three processes 146, 148, 150 are completed by the end of time period $T_6$.

In alternative embodiments, the data can move along a processing pipeline. A data symbol would not reside in the same memory section during its entire duration of processing but rather be move along to other memory sections by the engines. For example, instead of all the processing units reading $S_1$ from $M_1$, the engines would move S1 along $M_1$, $M_2$, and so on. This implementation may require hardware to transfer data along the pipeline as well as at least four memory sections (instead of three) to ensure the post-processing engine will always have data to transmit.

Figure 2D:
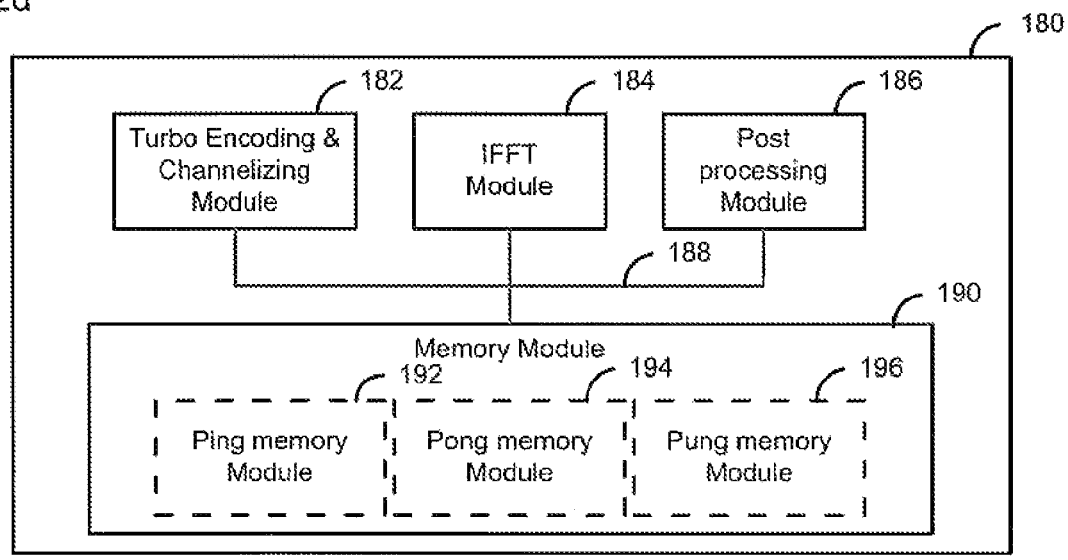
FIG. 2d is a block diagram illustrating a telecommunications IFFT processing system.

FIG. 2d shows a block diagram design of an exemplary transmission processing system 180 that resolves the transmission/processing gap-clock budgeting issue. The components illustrated in FIG. 2a can be implemented by modules as shown here in FIG. 2d. As a modular implementation, the processing system 180 includes processing modules (an encoder module 182, an IFFT processing module 184, a post-processing module 186), and a memory module 190 connected to the processing modules 182, 184, 186. The memory module 190 includes three memory module sections (module sectors), a ping memory module 192, a pong memory module 194, and a pung memory module 196. Each of the processing modules 182, 184, 186 has access to each of the memory modules sections 192, 194, 196. Although the modules may access any of the memory modules sections 192, 194, 196 at any time, typically, the processing modules processes data at a single memory module section until the processing module completes its processing. Upon completion, the processing module begins processing data at a different memory module sector.

The information flow between these modules is similar to that of FIG. 2a and described in FIGS. 2b and 2c. The processing system module 180 has a means for providing a memory module 190 having first 192, second 194 and third 196 module sections, a means for encoding data (in turbo encoding and channelizing module 182) in each of the first 192, second 194 and third 196 memory sections in a round robin fashion, a means for IFFT processing (in IFFT module 184) the encoded data in each of the first 192, second 194, and third 196 sections in a round robin fashion, and a means for post-processor processing (in post-processing module 186) the IFFT processed data in each of the first 192, second 194 and third 196 memory sections in a round robin fashion.

FIG. 3a shows a block diagram design of another exemplary transmission processing system 50 that resolves the transmission/processing gap-clock budgeting issue. The processing system 200 includes an encoder engine 202, an IFFT processing engine 204, a post-processing engine 206, and a memory 210 connected to the engines 202, 204, 206. The memory 210 includes four (4) memory sections (sectors), a ping memory A 212a, a ping memory B 212b, a pong memory A 214a, and a pong memory B 214b. Ping memory A 212a and ping memory B 212b combine to form, a combined ping memory 212. Pong memory A 214a and pong memory B 214b combine to form a combined pong memory 214. The encoder 202 has accesses ping memory A 212a, ping memory B 212b, pong memory A 214a, and pong memory B 214b. The IFFT 204 can access ping memory A 212a, ping memory B 212b, pong memory A 214a, and pong memory B 214b. The post processing engine 206 can access to the combined ping memory 212 and the combined pong memory 214. Although the engines may access any of the memory sections as described above at any time, typically, the engines processes data at a single memory section until the engine completes its processing. Upon completion, the engine begins processing data at a different memory sector.

Figure 3B:
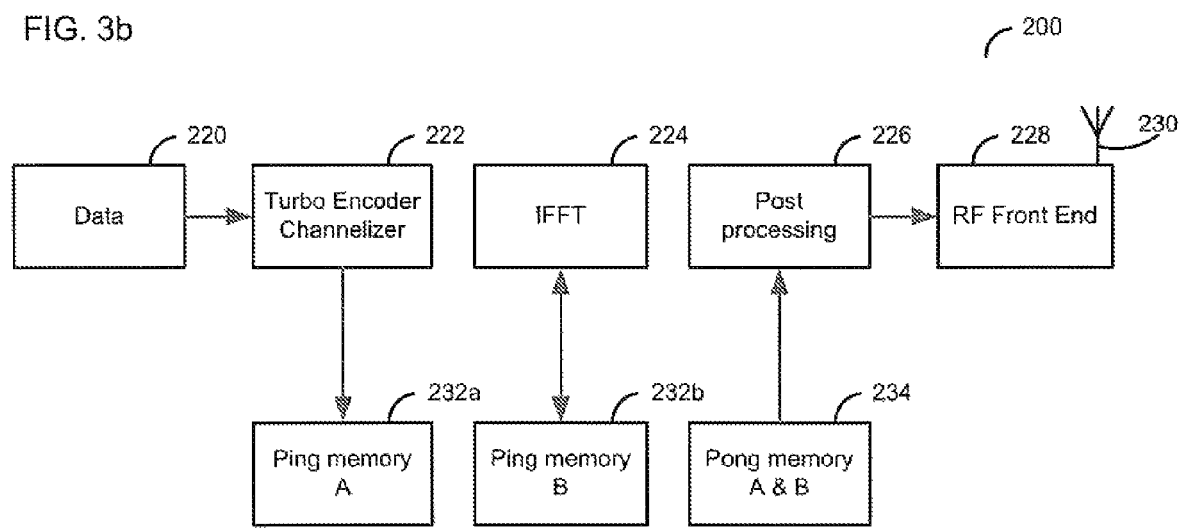
FIG. 3b is a block diagram illustrating information flow in a telecommunications IFFT processing system.
Figure 3B:
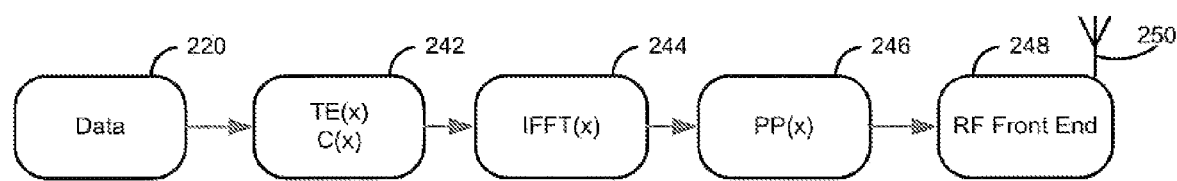

FIG. 3b shows a time-instant snapshot of the data flow for the transmission processing system 200. From a functional process, the data 220 is first encoded 242. An IFFT 244 is carried out on the encoded data, the results of which are sent to the post-processing engine for post-processing 246. The post-processing engine transfers 246 the post-processed data to the RF Front End 248 for transmission over a broadcast antenna 250.

Taking a snapshot of the data flow, the encoder engine 222 receives data 220 such as 8K of information. The 8K of data may be an entire symbol or sufficient interlaces of data to complete a constellation map (as processed by the channelizer). The encoder engine 222 then encodes half the data (4K), and stores the encoded data in the first memory sector such as the ping memory A 232a. The encoder will encode all 8K eventually but works on half at a time. For example, the even interlaces. In the MediaFLO system, the data is a symbol in the frequency domain. The turbo encoder 232a encodes and bit interleaves the frequency domain data. The channelizer loads the tones onto specific frequencies based on a constellation map (if one exists), a process also known as symbol mounting.

While the encoder 222 is encoding the symbols 220, the IFFT engine 224 performs an IFFT on an encoded data stored in the second memory section 224 (ping memory B). In the case of the 8K symbol, a 4K encoded data resides in the ping memory B 224b at the start of the IFFT processing. This is the half that was previously processed by the turbo encoder. If the encoder is currently working on the even interlaces, this half would the be encoded odd interlaces. The IFFT engine converts the data from the frequency domain into the time domain, and executes some minor processing before the IFFT-processed (IFFTed) data is written back into the ping memory 224b. MediaFLO performs the 8K, IFFT in two steps, performing a 4K IFFT on the even memory bank of the ping memory and performing a 4K IFFT on the odd memory bank of the ping memory.

In terms of clocks, encoding the first 4K requires 2048 clocks. At this time, the IFFT is not processing data. After the first 4K has been encoded, the encoder begins processing on the second 4K (also 2048 clocks). While the encoder processes the second 4K, the IFFT processes the encoded first 4K, a process that requires 1360 clocks. Since the IFFT clock requirements are less than that of the encoder, the IFFT time is hidden by the encoder processing. When the encoder completes processing the second 4K, the IFFT begins processing the second 4K. This staged round-robin processing technique requires 5436 clocks (4096+1360=5436).

While the encoder 82 and the IFFT engine 84 are processing their respective data, the post-processing engine 86 processes the IFFTed data stored in the third and fourth memory section 234 (pong memories A and B). The two memory sections are processed together (8K). The post-processing engine retrieves the IFFTed data, prepares the information for RF transmission, and sends the data to the RF Front End 228 (and antenna 230) for transmission. In post-processing, the OFDM requires a cyclic prefix be added to the symbol. The post-processor engine 226 attaches the cyclic prefix to the symbol. The tail frame (512 symbols) is copied to the front of the symbol producing a cycling prefix. The linear convolution becomes a circular convolution. This is used by the remote receiver (not shown) to correct channel transmission errors.

In the two memory system described in FIG. 1, the encoding and the IFFT are executed sequentially in the same memory section resulting in 39,382 clocks. In this quad-memory (or quad-level) pipeline implementation, the encoder and the IFFT are processed on separate memory sections and therefore may execute concurrently. Since both the encoder and the IFFT require less time than the post-processing, the post-processing may process continuously without encountering any transmission/processing gaps. This quad-memory (or quad-level) pipelining techniques resolves the transmission/processing gap issue.

FIG. 3c is a exemplary time-process diagram for a telecommunications IFFT processing system 200. This quad-memory architecture can be implemented in multiple ways.

To illustrate the process and timing of the system 200, we assume the system 200 is not processing data at time period $T_0$ (not shown; denotes initial start state). The system starts at time period $T_1$ with the encoder processing a symbol $S_{1a}$ (a half 4K symbol) to be stored in memory $M_{1a}$. In this process, the encoder turbo encodes the interlaces, channelizes the symbol, and write the resulting $S_{1a}$ back onto $M_{1a}$. This process 122 is completed by the end of time period $T_1$.

At $T_2$, the IFFT engine processes $S_{1a}$ (currently stored in $M_{1a}$). This process 264 involves the IFFT engine reading $S_{1a}$ from $M_{1a}$, performing the IFFT, and writing the results back onto $M_{1a}$. While process 264 is taking place, the encoder begins processing a symbol $S_{1b}$ to be stored in memory $M_{1b}$ (process 266). Much like in process 262, process 266 involves the encoder turbo encoding the interlaces (that constitute $S_{1b}$), channelizing the $S_{1b}$, and writing the resulting $S_{1b}$ back onto $M_{1b}$. Both processes 264, 266 are completed by the end of time period $T_2$.

At $T_3$, the IFFT engine processes $S_{1b}$ (currently stored in $M_{1b}$). This process 268 involves the IFFT engine reading $S_{1b}$ from $M_{1b}$, performing the IFFT, and writing the results back onto $M_{1b}$. Process 266 will complete prior to $T_3$. Some processing takes place that combines the information of $S_{1a}$ (stored in $M_{1a}$) and $S_{1b}$ (stored in $M_{1b}$) to produce a complete symbol $S_1$. The area where $S_1$ is stored in a combined memory section designated $M_1$. $M_1$ is a combination of $M_{1a}$ and $M_{1b}$.

At $T_4$, the post-processing engine (PP) processes $S_1$ (stored in $M_1$). This process 270 includes reading the symbol $S_1$ from $M_1$, performing any necessary residual processing, and initiating the symbol transmission process at the RF Front End. Also at $T_4$, the encoder begins processing a symbol $S_{2a}$ to be stored in memory $M_{2a}$ (process 272). Much like in process 262, process 272 involves the encoder turbo encoding the interlaces (that constitute $S_{2a}$), channelizing the $S_{2a}$, and writing the resulting $S_{2a}$ back onto $M_{2a}$. By $T_5$, process 272 will have finished but processes 270 will not. The post-processing takes considerable longer and the system is designed to accommodate this. Specifically, the system is designed to accommodate the post-processing until the end of $T_6$.

$T_5$, $T_6$, and $T_7$ illustrate what happens to a pipeline when the three memory sections have data in them and illustrates the round-robin concept of quad-memory data processing. The term round-robin is used in several contexts and typically means that a number of things are taking turns at something. For example, the engines in the implementation illustrated by FIG. 2c are taking turns reading and writing to the four memory sections. Round-robin may also be other turn-taking implementations.

To continue with FIG. 2c, at $T_5$, symbol $S_1$ has not completed processing in this pipeline. $T_5$ begins with the post-processing engine's (PP) continued processing of $S_1$ (still stored in $M_1$). The post-processing engine will not be required to process a different symbol until $T_7$. Also at $T_5$, the IFFT engine processes $S_{2a}$ (currently stored in $M_{2a}$). This process 274 involves the IFFT engine reading $S_{2a}$ from $M_{2a}$, performing the IFFT, and writing the results back onto $M_{2a}$. While processes 270 and 274 are taking place, the encoder begins processing a symbol $S_{2b}$ to be stored in memory $M_{2b}$ (process 262). Much like in process 262, process 276 involves the encoder turbo encoding the interlaces (that constitute $S_{2b}$), channelizing the $S_{2b}$, and writing the resulting $S_{2b}$ back onto $M_{2b}$. By $T_6$, process 276 will have finished but processes 270 will not. The post-processing takes considerable longer and the system is designed to accommodate this. Specifically, the system is designed to accommodate the post-processing until the end of $T_6$.

At $T_6$, the IFFT engine processes $S_{2b}$ (currently stored in $M_{2b}$). This process 278 involves the IFFT engine reading $S_{2b}$ from $M_{2b}$, performing the IFFT, and writing the results back onto $M_{2b}$. Process 278 will complete prior to $T_7$. Some processing takes place that combines the information of $S_{2a}$ (stored in $M_{2a}$) and $S_{2b}$ (stored in $M_{2b}$) to produce a complete symbol $S_2$. The area where $S_2$ is stored in a combined memory section designated $M_2$. $M_2$ is a combination of $M_{2a}$ and $M_{2b}$.

At $T_7$, the post-processing engine (PP) processes $S_2$ (stored in $M_2$). This process 280 includes reading the symbol $S_2$ from $M_2$, performing any necessary residual processing, and initiating the symbol transmission process at the RF Front End. Also at $T_7$, the encoder begins processing a symbol $S_{3a}$ to be stored in memory $M_{3a}$ (process 282). Much like in process 262, process 282 involves the encoder turbo encoding the interlaces (that constitute $S_{3a}$), channelizing the $S_{3a}$, and writing the resulting $S_{3a}$ back onto $M_{3a}$. By $T_8$ (not shown), process 282 will have finished but processes 280 will not. The post-processing takes considerable longer and the system is designed to accommodate this. Specifically, the system is designed to accommodate the post-processing until the end of $T_9$ (not shown).

Figure 3D:
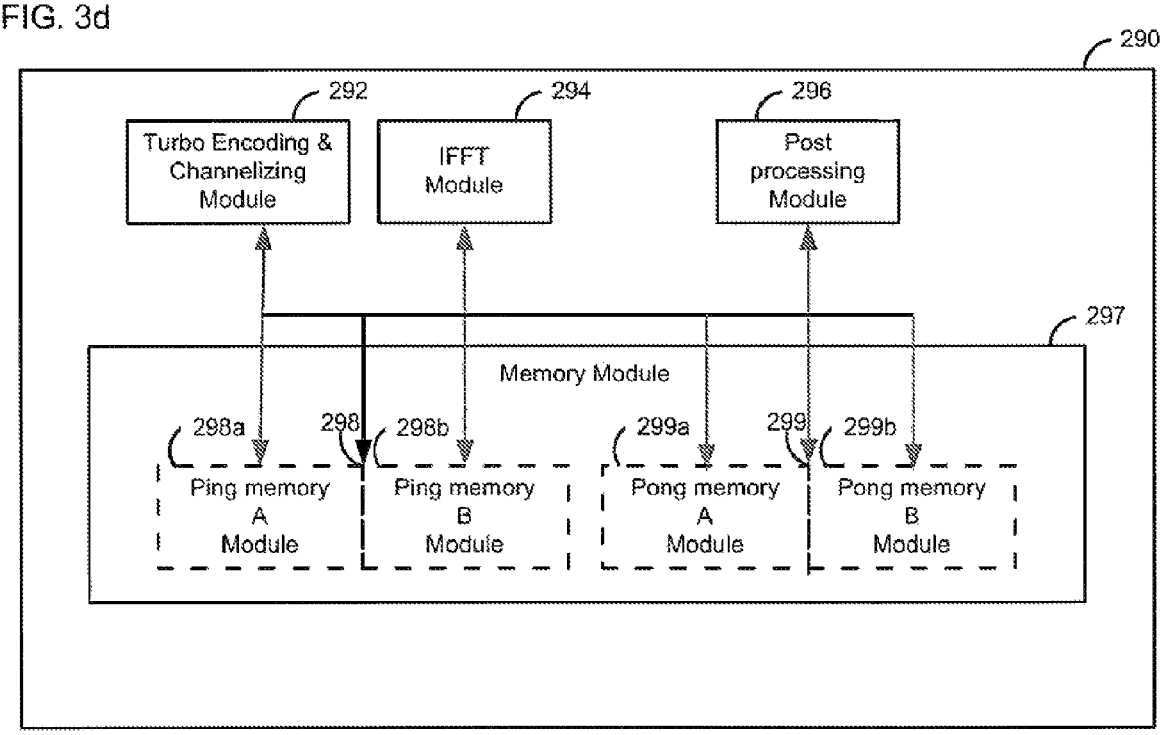
FIG. 3d is a block diagram illustrating a telecommunications IFFT processing system.

FIG. 3d shows a block diagram design of another exemplary transmission processing system 290 that resolves the transmission/processing gap-clock budgeting issue. The components illustrated in FIG. 3a can be implemented by modules as shown here in FIG. 3d. As a modular implementation, the processing system 290 includes an encoder module 292, an IFFT processing module 294, a post-processing module 296, and a memory module 297 connected to the modules 292, 294, 296. The memory module 297 includes four (4) memory sections module (sectors), a ping memory A module 298a, a ping memory B module 298b, a pong memory A module 299a, and a pong memory B module 299b. Ping memory A module 298a and ping memory B module 298b combine to form a combined ping memory module 298. Pong memory A module 299a and pong memory B module 299b combine to form a combined pong memory module 299. The encoder module 292 has accesses ping memory A module 298a, ping memory B module 298b, pong memory A module 299a, and pong memory B module 299b. The IFFT module 294 can access ping memory A module 298a, ping memory B module 298b, pong memory A module 299a, and pong memory B module 299b. The post processing module 296 can access to the combined ping memory module 298 and the combined pong memory module 299. Although the modules may access any of the memory section modules as described above at any time, typically, the module processes data at a single memory section module until the module completes its processing. Upon completion, the module begins processing data at a different memory sector module.

The information flow between these modules is similar to that of FIG. 3a and described in FIGS. 3b and 3c. The processing system module 290 has a means for providing a memory module 297 having first 298a, second 298b, third 299a, and fourth 299b module sections, a means for encoding data (in the turbo encoding and channelizing module 292) in each of the first 298a, second 298b, third 299a, and fourth 299b memory sections in a round robin fashion, a means for IFFT processing (in the IFFT module 294) the encoded data in each of the first 298a, second 298b, third 299a, and fourth 299b section modules, and a means for post-processor processing (in the post processing module 296) the IFFT processed data in each of the first 298a, second 298b, third 299a, and fourth 299b memory section modules.

The means for post-processor processing 296 the first 298a and second 298b memory section modules is processed as a first combined memory section module 298, and the means for post-processor processing 296 the third 299a and fourth 299b memory section modules is processed as a second combined memory section module 299. The means for encoding 292, IFFT processing 294, and post-processor processing 296 is at the same clock speed.

Figure 4A:
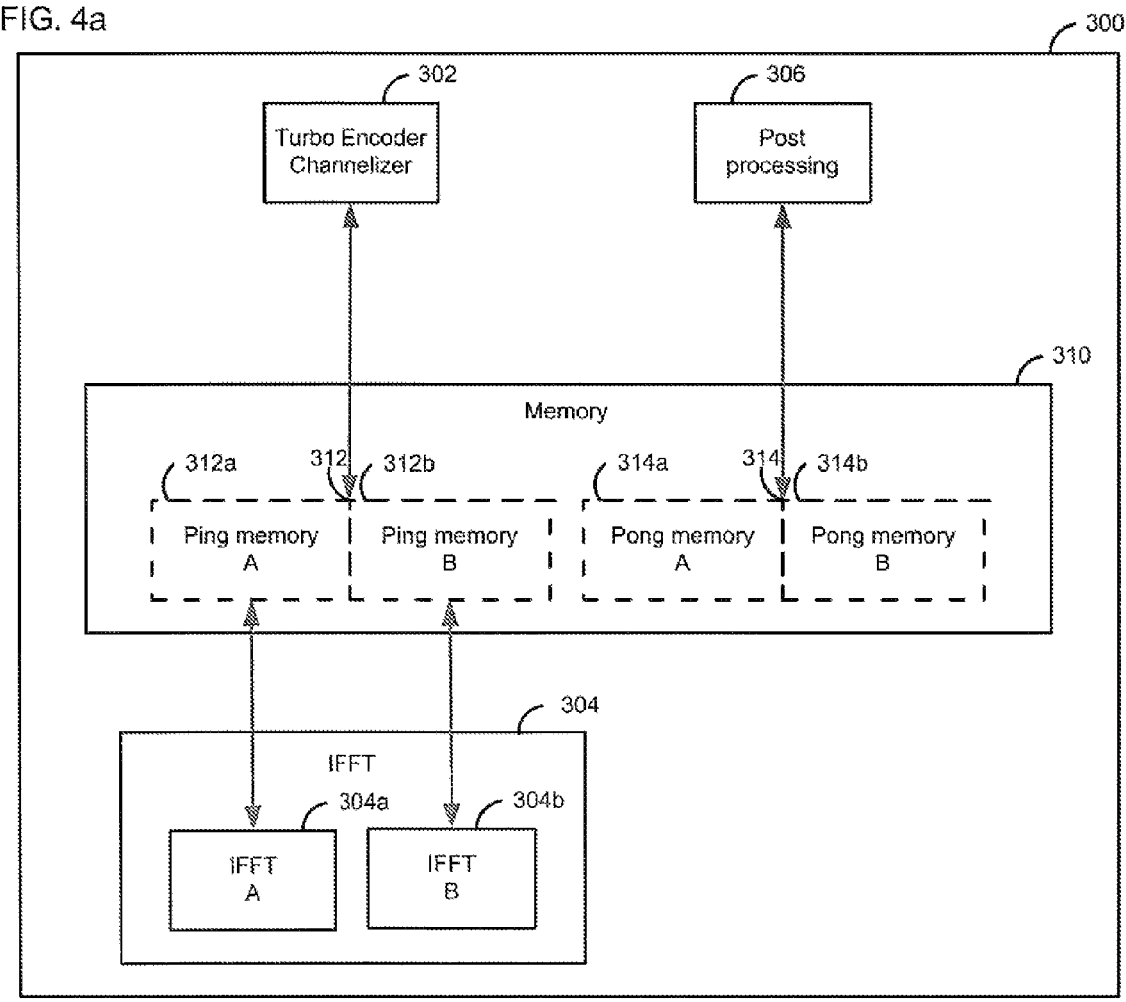
FIG. 4a is a block diagram illustrating a telecommunications IFFT processing system.

FIG. 4a shows a block diagram design of another exemplary transmission processing system 50 that resolves the transmission/processing gap-clock budgeting issue. The processing system 300 includes an encoder engine 302, an IFFT processing engine 304, a post-processing engine 306, and a memory 310 connected to the engines 302, 304, 306. The memory 310 includes four (4) memory sections (sectors), a ping memory A 312a, a ping memory B 312b, a pong memory A 314a, and a pong memory B 314b. Ping memory A 312a and ping memory B 312b combine to form a combined ping memory 312. Pong memory A 314a and pong memory B 314b combine to form a combined pong memory 314. The encoder 302 and the post-processing engine 306 can access the combined ping memory 312 and combined pong memory 314. The IFFT can access all four sectors 312a, 312b, 314a, 314b. The IFFT engine 304 includes two sub-engines, IFFT sub-engine A 304a and IFFT sub-engine B 304b, Although the IFFT engine 304 works on the combined memories 312, 314, the sub-engines work on the individual sector level 312a, 312b, 314a, 314b. The engines 312, 314, 316 may access any of the memory sections as described above at any time, typically, the engines processes data at a single memory section until the engine completes its processing. Upon completion, the engine begins processing data at a different memory sector.

FIG. 4b shows a time-instant snapshot of the data flow for the transmission processing system 300. From a functional process, the data 320 is first encoded 342. An IFFT 344 is carried out on the encoded data, the results of which are sent to the post-processing engine for post-processing 346. During the IFFT 344 processing, the data is divided into multiple (two) parts and the two sub IFFT engines processes the parts in parallel. The processes data portions are recombined and written to the combined memory. The post-processing engine transfers 346 the post-processed data to the RF Front End 348 for transmission over a broadcast antenna 350.

Taking a snapshot of the data flow, the encoder engine 322 receives data 320 such as 8K of information. The 8K of data may be an entire symbol or sufficient interlaces of data to complete a constellation map (as processed by the channelizer). The encoder engine 322 then encodes the data 320 and stores the encoded data in the first combined memory section 332 (ping memory). In processing the data 320, the encoder splits the data into two parts and stores the processed parts in different memory sections. The reason for this is the IFFT sub-engines will process the individual parts, not the entire encoded 8K-data. For example, the even interlaces can be encoded and stored in ping memory A while the odd Interlaces encoded and stored in ping memory B. In the Media-FLO system, the data is a symbol in the frequency domain. The turbo encoder 332 encodes and bit interleaves the frequency domain data. The channelizer loads the tones onto specific frequencies based on a constellation map (if one exists), a process also known as symbol mounting.

While the encoder 322 is encoding and dividing the symbols 320, the IFFT sub-engines 324a and 324b performs IFFTs on the encoded data parts 334a and 334b, respectively. In the case of the 8K symbol, a 4K encoded data resides in the ping memory A 334a at the start of the IFFT processing. This is the half that was previously processed by the turbo encoder. The IFFT engine converts the data from the frequency domain into the time domain, and executes some minor processing before the IFFT-processed (IFFTed) data is written back into the ping memory 334a. A second 4K encoded data resides in the ping memory B 334b at the start of the IFFT processing. This is the other half that was previously processed by the turbo encoder. The IFFT engine converts the data from the frequency domain into the time domain, and executes some minor processing before the IFFT-processed (IFFTed) data is written back into the ping memory 334b. MediaFLO performs the 8K IFFT in two parts, performing a 4K IFFT on the even memory bank of the ping memory and performing a 4K IFFT on the odd memory bank of the ping memory. The parts are processes concurrently by the two IFFT sub-engines 324a, 324b. After both IFFT sub-engines complete their processing, the two data portions 334a, 334b are recombined into the 8K IFFTed data. The data remained stored in the combined ping memory section 334.

While the encoder 322 and the IFFT engine 324 are processing their respective data, the post-processing engine 326 processes the IFFTed data stored in the combined third and fourth memory sections 336 (combined pong memories A and B). The two memory sections are processed together (8K). The post-processing engine retrieves the IFFTed data, prepares the information for RF transmission, and sends the data to the RF Front End 328 (and antenna 330) for transmission. In post-processing, the OFDM requires a cyclic prefix be added to the symbol. The post-processor engine 326 attaches the cyclic prefix to the symbol. The tail frame (512 symbols) is copied to the front of the symbol producing a cycling prefix. The linear convolution becomes a circular convolution. This is used by the remote receiver (not shown) to correct channel transmission errors.

In the two memory system described in FIG. 1, the encoding and the IFFT are executed sequentially in the same memory section resulting in 39,382 clocks. In this quad-memory (or quad-level) pipeline implementation, the two IFFT sub-engines processes on separate memory sections and therefore may execute concurrently. Since processing two 4K IFFTs requires less time than processing an 8K IFFT, the encoding/IFFT processing requires less time than the post-processing. Subsequently, the post-processing may process continuously without encountering any transmission/processing gaps. This quad-memory (or quad-level) pipelining techniques resolves the transmission/processing gap issue.

FIG. 4c is a exemplary time-process diagram for a telecommunications IFFT processing system 300. This quad-memory architecture can be implemented in multiple ways.

To illustrate the process and timing of the system 300, we assume the system 300 is not processing data at time period $T_0$ (not shown; denotes initial start state). The system starts at time period $T_1$ with the encoder processing a symbol $S_1$ to be stored in memory $M_1$. In this process, the encoder turbo encodes the interlaces, channelizes the symbol, and write the resulting $S_1$ back onto $M_1$. This process 362 is completed by the end of time period $T_1$.

At $T_2$, the IFFT engine processes $S_1$ (currently stored in $M_1$). Instead of processing the $S_1$ as an 8K IFFT, the IFFT engine processes the $S_1$ as two 4K IFFTs with IFFT's two sub-engines each processing one 4K data. These processes 364, 366 involve one IFFT sub-engine reading $S_{1a}$ from $M_{1a}$, performing the IFFT, and writing the results back onto $M_{1a}$, and the second IFFT sub-engine reading $S_{1b}$ from $M_{1b}$, performing the IFFT, and writing the results back onto $M_{1b}$. The two IFFT processing 364, 366 occur concurrently. $S_{1a}$ and $S_{1b}$ is then combined to form $S_1$ and is stored in $M_1$ (process 368). Because the IFFT is working in memory section $M_1$, the encoder cannot work in that memory area during $T_2$.

At $T_3$, the post-processing engine (PP) processes $S_1$ (stored in $M_1$). This process 370 includes reading the symbol $S_1$ from $M_1$, performing any necessary residual processing, and initiating the symbol transmission process at the RF Front End. Also during $T_3$, the encoder begins processing a symbol $S_2$ to be stored in memory $M_2$ (process 372). Much like in process 362, process 372 involves the encoder turbo encoding the interlaces (that constitute $S_2$), channelizing the $S_2$, and writing the resulting $S_2$ back onto $M_2$. By $T_4$, process 372 will have finished but processes 370 will not. The post-processing takes considerable longer and the system is designed to accommodate this. Specifically, the system is designed to accommodate the post-processing until the end of $T_4$.

$T_4$ begins with the post-processing engine's (PP) continued processing of $S_1$ (still stored in $M_1$). The post-processing engine will not be required to process a different symbol until $T_5$. Also at $T_4$, the IFFT engine processes $S_2$ (currently stored in $M_2$). Instead of processing the $S_2$ as an 8K IFFT, the IFFT engine processes the $S_2$ as two 4K IFFTs with IFFT's two sub-engines each processing one 4K data. These processes 374, 376 involve one IFFT sub-engine reading $S_{2a}$ from $M_{2a}$, performing the IFFT, and writing the results back onto $M_{2a}$, and the second IFFT sub-engine reading $S_{2b}$ front $M_{2b}$, performing the IFFT, and writing the results back onto $M_{2b}$. The two IFFT processing 374, 376 occur concurrently. $S_{2a}$ and $S_{2b}$ is then combined to form $S_2$ and is stored in $M_2$ (process 378). Because the IFFT is working in memory section $M_2$, the encoder cannot work in that memory area during $T_4$.

At $T_5$, the post-processing engine (PP) processes $S_2$ (stored in $M_2$). This process 380 includes reading the symbol $S_2$ from $M_2$, performing any necessary residual processing, and initiating the symbol transmission process at the RF Front End. Also during $T_5$, the encoder begins processing a symbol $S_3$ to be stored in memory $M_1$ (process 382). Much like in process 362, process 382 involves the encoder turbo encoding the interlaces (that constitute $S_3$), channelizing the $S_3$, and writing the resulting $S_3$ back onto $M_1$. By $T_6$ (not shown), process 382 will have finished but processes 380 will not. The post-processing takes considerable longer and the system is designed to accommodate this. Specifically, the system is designed to accommodate the post-processing until the end of $T_6$.

FIG. 4d shows a block diagram design of another exemplary transmission processing system 390 that resolves the transmission/processing gap-clock budgeting issue. The components illustrated in FIG. 4a can be implemented by modules as shown here in FIG. 4d. As a modular implementation, the processing system 390 includes an encoder module 392, an IFFT processing module 394, a post-processing module 396, and a memory module 397 connected to the modules 392, 394, 396. The memory module 397 includes four (4)

memory section module (sectors), a ping memory A module 398*a*, a ping memory B module 398*b*, a pong memory A module 399*a*, and a pong memory B module 399*b*. Ping memory A module 398*a* and ping memory B module 398*b* combine to form a combined ping memory module 398. Pong memory A module 399*a* and pong memory B module 399*b* combine to form a combined pong memory module 399. The encoder module 392 and the post-processing module 396 can access the combined ping memory module 398 and combined pong memory module 399. The IFFT can access all four sector modules 398*a*, 398*b*, 399*a*, 399*b*. The IFFT module 394 includes two sub-modules, IFFT sub-module A 394*a* and IFFT sub-module B 394*b*. Although the IFFT module 394 works on the combined memory modules 398, 399, the sub-modules work on the individual sector module level 398*a*, 398*b*, 399*a*, 399*b*. The modules 392, 394, 396 may access any of the memory section modules as described above at any time, typically, the modules processes data at a single memory section module until the processing module completes its processing. Upon completion, the processing module begins processing data at a different memory sector module.

The information flow between these modules is similar to that of FIG. 4*a* and described in FIGS. 4*b* and 4*c*. The processing system module 390 has a means for providing a memory module 397 having first 398*a*, second 398*b*, third 399*a*, and fourth 399*b* module sections, a means for encoding data (in turbo encoding and channelizing module 392) in each of the first 398*a*, second 398*b*, third 399*a*, and fourth 399*b* memory sections in a round robin fashion, a means for IFFT processing (in IFFT module 394) the encoded data in each of the first 398*a*, second 398*b*, third 399*a*, and fourth 399*b* section modules, and a means for post-processor processing (in post processing module 396) the IFFT processed data in each of the first 398*a*, second 398*b*, third 399*a*, and fourth 399*b* memory section modules.

The means for post-processor processing 396 the first 398*a* and second 398*b* memory section modules is processed as a first combined memory section 398, and the means for post-processor processing 396 the third 399*a* and fourth 399*b* memory section modules is processed as a second combined memory section 399. The means for encoding 392 the first 398*a* and second 398*b* memory section modules is processed as a first combined memory section 398, and a means for encoding 392 the third 399*a* and fourth 399*b* memory section modules may be processed as a second combined memory section 399. The means for IFFT processing 394 the first 398*a* and second 398*b* memory section modules is processed as a first combined memory section 398 and the third 399*a* and fourth 399*b* memory section modules is processed as a second combined memory section 399, the means for IFFT sub-processing (in IFFT A module 394*a* and IFFT B module 394*b*) the memory section modules of the combined memory section modules 398, 399 occur concurrently. The means for encoding 392, IFFT processing 394, and post-processor processing 396 is at the same clock speed.

Figure 5:
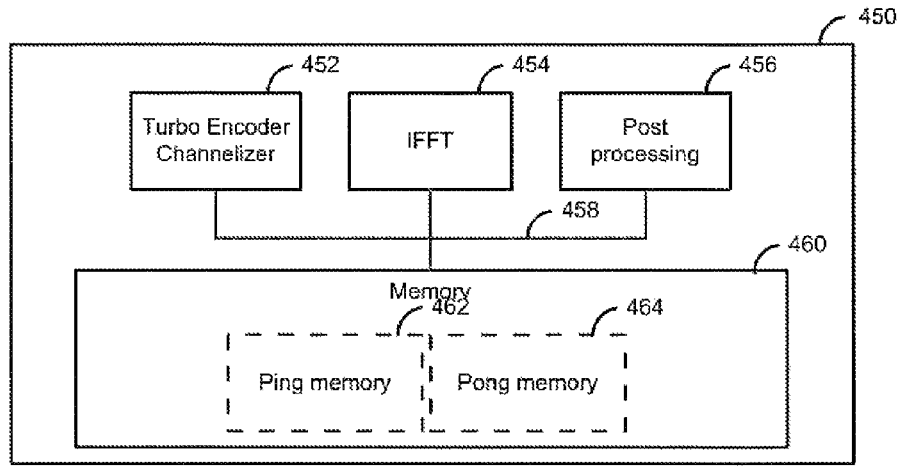
FIG. 5 is a block diagram illustrating a telecommunications IFFT processing system.

FIG. 5 shows a block diagram, design of an exemplary transmission processing system 50 that resolves the transmission/processing gap-clock budgeting issue. The processing system 450 includes an encoder engine 452, an IFFT processing engine 454, a post-processing engine 456, and a memory 460 connected to the engines 452, 454, 456. The memory 460 includes two memory sections (sectors), a ping memory 462, and a pong memory 464. Each of the engines 452, 454, 456 has access to each of the memory sections 462, 464. Although the engines may access any of the memory sections 462, 464 at any time, typically, the engines processes data at a single memory section until the engine completes its processing. Upon completion, the engine begins processing data at a different memory sector.

Figure 6:
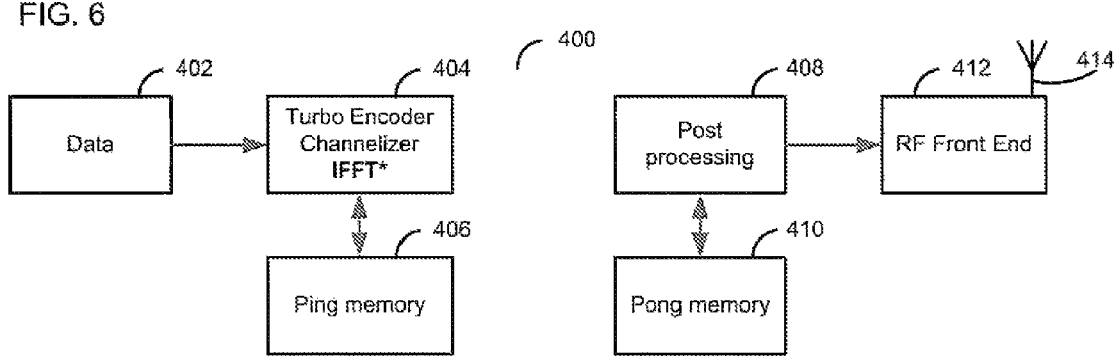
FIGS. 6 and 7 are conceptual block diagrams illustrating examples of telecommunications IFFT processing system information flow.

FIG. 6 shows a time-instant snapshot of the data flow for the transmission processing system 400. The architecture is that illustrated in FIG. 5, a dual-memory architecture where the processing system contains each of the engines have access to each of the two memory sections. From a functional process, the data 402 is first encoded. An IFFT is carried out on the encoded data, the results of which are sent to the post-processing engine for post-processing. The post-processing engine transfers the post-processed data to the RF Front End for transmission over a broadcast antenna.

Taking a snapshot of the data flow, the encoder engine 404 receives data 402 such as 8K of information. The 8K of data may be an entire symbol or sufficient interlaces of data to complete a constellation map (as processed by the channelizer). The encoder engine 404 then encodes the data 402 and stores the encoded data in the first memory section 406 (ping memory). In the MediaFLO system, the data is a symbol in the frequency domain. The turbo encoder 404 encodes and bit interleaves the frequency domain data. The channelizer loads the tones onto specific frequencies based on a constellation map (if one exists), a process also known as symbol mounting. The IFFT 404 performs an IFFT on the encoded data. The IFFT engine converts the data from the frequency domain into the time domain, and executes some minor processing before the IFFT-processed (IFFTed) data is written back into the ping memory 406.

While the encoder 404 and the IFFT engine 404 are processing their respective data, the post-processing engine 408 processes the IFFTed data stored in the second memory section 410 (pong memory). The post-processing engine retrieves the IFFTed data, prepares the information for RF transmission, and sends the data to the RF Front End 412 (and antenna 414) for transmission. In post-processing, the OFDM requires a cyclic prefix be added to the symbol. The post-processor engine 408 attaches the cyclic prefix to the symbol. The tail frame (512 symbols) is copied to the front of the symbol producing a cycling prefix. The linear convolution becomes a circular convolution. This is used by the remote receiver (not shown) to correct channel transmission errors.

In the two memory system described in FIG. 1, the encoding and the IFFT are executed sequentially in the same memory section resulting in 39,382 clocks. In this dual-memory (or dual-level) implementation, the IFFT engine processes at a faster clock speed (processing speed) than the other engines. By designing the IFFT engine so that it runs at least 2,382 clocks faster, the encoder/IFFT will complete within the clock budget. Known approaches to increasing processing speed (examples: a faster processor clock; faster bus speed; larger multiplier) are suitable for increasing the IFFT engine's processing speed. Subsequently, the post-processing may process continuously without encountering any transmission/processing gaps because the encoding/IFFT processing requires less time than the post-processing. The transmission/processing gap issue is resolved.

Figure 7:
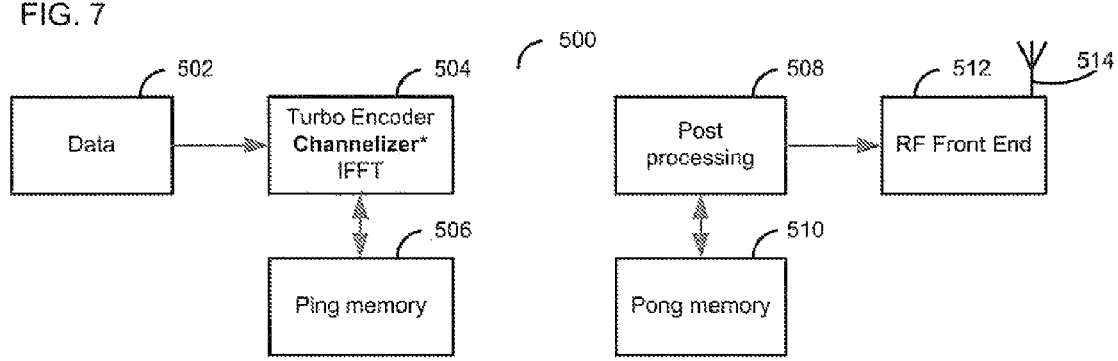

FIG. 7 shows a time-instant snapshot of the data flow for the transmission processing system 500. The architecture is that illustrated in FIG. 5, a dual-memory architecture where the processing system contains each of the engines have access to each of the two memory sections. From a functional process, the data 502 is first encoded. An IFFT is carried out on the encoded data, the results of which are sent to the post-processing engine for post-processing. The post-processing engine transfers the post-processed data to the RF Front End for transmission over a broadcast antenna.

Taking a snapshot of the data flow, the encoder engine 504 receives data 502 such as 8K of information. The 8K of data may be an entire symbol or sufficient interlaces of data to complete a constellation map (as processed by the channelizer). The encoder engine 504 then encodes the data 502 and stores the encoded data in the first memory section 506 (ping memory). In the MediaFLO system, the data is a symbol in the frequency domain. The turbo encoder 504 encodes and bit interleaves the frequency domain data. The channelizer loads the tones onto specific frequencies based on a constellation map (if one exists), a process also known as symbol mounting. The IFFT 504 performs an IFFT on the encoded data. The IFFT engine converts the data from the frequency domain into the time domain, and executes some minor processing before the IFFT-processed (IFFTed) data is written back into the ping memory 506.

While the encoder 504 and the IFFT engine 504 are processing their respective data, the post-processing engine 508 processes the IFFTed data stored in the second memory section 510 (pong memory). The post-processing engine retrieves the IFFTed data, prepares the information for RF transmission, and sends the data to the RF Front End 512 (and antenna 514) for transmission. In post-processing, the OFDM requires a cyclic prefix be added to the symbol. The post-processor engine 508 attaches the cyclic prefix to the symbol. The tail frame (512 symbols) is copied to the front of the symbol producing a cycling prefix. The linear convolution becomes a circular convolution. This is used by the remote receiver (not shown) to correct channel transmission errors.

In the two memory system described in FIG. 1, the encoding and the IFFT are executed sequentially in the same memory section resulting in 39,382 clocks. In this dual-memory (or dual-level) implementation 500, the channelizer engine processes at a faster clock speed (processing speed) than the other engines. By designing the channelizer engine so that it runs at least 2,382 clocks faster, the encoder/IFFT will complete within the clock budget. Known approaches to increasing processing speed (examples: a faster processor clock; faster bus speed; larger multiplier) are suitable for increasing the IFFT engine's processing speed. Subsequently, the post-processing may process continuously without encountering any transmission/processing gaps because the encoding/IFFT processing requires less time than the post-processing. The transmission/processing gap issue is resolved.

Figure 8:
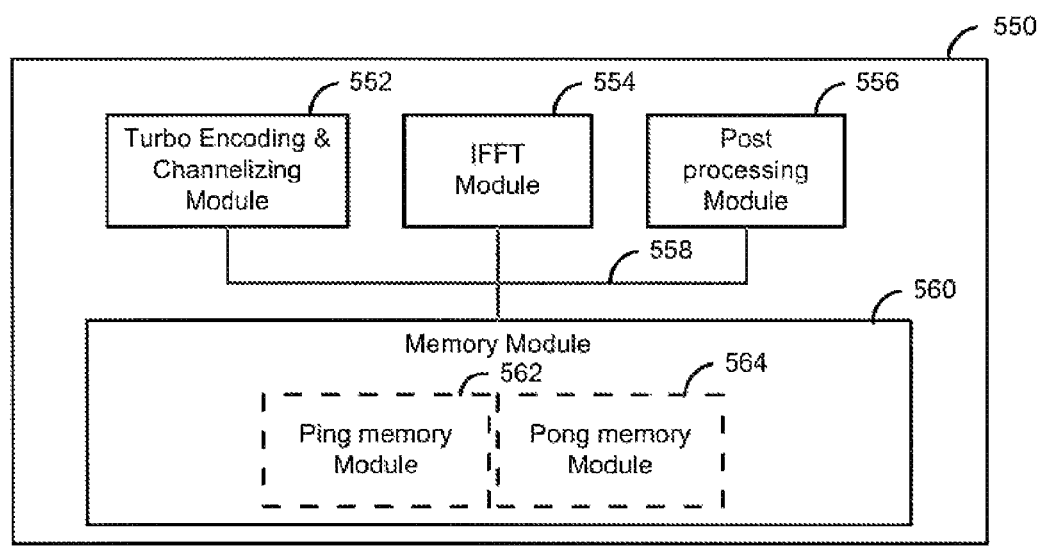
FIG. 8 is a block diagram illustrating a telecommunications IFFT processing system.

FIG. 8 shows a block diagram design of another exemplary transmission processing system 550 that resolves the transmission/processing gap-clock budgeting issue. The components illustrated in FIG. 5 can be implemented by modules as shown here in FIG. 8. As a modular implementation, the processing system 550 includes an encoder module 552, an IFFT processing module 554, a post-processing module 556, and a memory module 560 connected to the processing modules 552, 554, 556. The memory module 560 includes two memory section modules (sectors), a ping memory module 562, and a pong memory module 564. Each of the processing modules 552, 554, 556 has access to each of the memory section modules 562, 564. Although the processing modules may access any of the memory section modules 562, 564 at any time, typically, the processing modules process data at a single memory section module until the processing module completes its processing. Upon completion, the processing module begins processing data at a different memory sector module.

The information flow between these modules is similar to that of FIG. 5 and described in FIGS. 6 and 7. The processing system module 550 has a means for providing a memory 560 having first 562 and second 564 sections, a means for encoding 552 data in each of the first 562 and second 564 memory sections, a means for IFFT processing 554 the encoded data in the first 562 and second 564 memory sections, and a means for post-processor processing 556 the IFFT processed data in the first 562 memory section while IFFT 554 processing the encoded data in the second 564 memory section, the means for post processor processing 556 configured to operate at a different clock speed than the means for encoder 552 or the means for IFFT 554.

The means for IFFT processing 554 may be at a different clock speed than the means for encoding 552. The means for encoding 552 may include channelizing at a different clock speed than the means for IFFT processing 554. The means for IFFT processing 554 may be at a faster clock speed than the means for encoding 552. The means for encoding 552 may be at a faster clock speed than the means for IFFT processing 554.

The IFFT processing techniques described herein may be implemented by various means. For example, these techniques may be implemented in hardware, firmware, software, or a combination thereof. For a hardware implementation, the processing units used to perform IFFT may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 60 in FIG. 2*a*) and executed by a processor. The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processing system, comprising:
a memory having first, second and third sections that are each shared exclusively by an encoder, an IFFT, and a post-processor, where the encoder and the IFFT read from, and write to, the memory sections, and the post-processor reads from the memory sections;
the encoder configured to process data in each of the first, second and third memory sections in a round robin fashion, wherein the encoder reads a first data from the first memory section, processes the first data, and writes the first data back to the first memory section as a first encoded data;
the IFFT configured to process the encoded data in each of the first, second, and third sections in a round robin fashion, wherein the IFFT is further configured to read the first encoded data from the first memory section, process the first encoded data, and write the first encoded data back to the first memory section as a first IFFT processed data, concurrent to the encoder reading a second data from the second memory section, processing the second data, and writing the second data back to the second memory section as a second encoded data; and the post-processor configured to process the IFFT processed data in each of the first, second and third memory sections in a round robin fashion, wherein the post-processor is further configured to read the first IFFT processed data from the first memory section and process the first IFFT processed data concurrent to the IFFT reading the second encoded data from the second memory section, processing the second encoded data, and writing the second encoded data back to the second memory section as a second IFFT processed data, and concurrent to the encoder reading a third data from the third memory section, processing the third data, and writing the third data back to the third memory section as a third encoded data, such that the encoder, the IFFT, and the post-processor take turns accessing each of the first, second, and third memory sections.

2. The processing system, of claim 1, further comprising:
at least one multipurpose processor configured to implement at least one of the encoder, the IFFT, and the post-processor.

3. The processing system of claim 1, further comprising:
the memory having a fourth section;
an encoder configured to process data in each of the first, second, third, and fourth memory sections in a round robin fashion;
an IFFT configured to process the encoded data in each of the first, second, third, and fourth sections; and
a post-processor configured to process the IFFT processed data in each of the first, second, third, and fourth memory sections.

4. The processing system of claim 3, wherein:
the post-processor processes the first and second memory sections as a first combined memory section, and the third and fourth memory sections as a second combined memory section.

5. The processing system of claim 4, wherein:
the encoder processes the first and second memory sections as a first combined memory section, and the third and fourth memory sections as a second combined memory section.

6. The processing system of claim 3, wherein:
the IFFT processes the first and second memory sections as a first combined memory section, and the third and fourth memory sections as a second combined memory section;
the IFFT sub-processes the memory sections of the combined memory sections concurrently.

7. The processing system of claim 3, wherein:
the encoder, the IFFT, and the post-processor operate at the same clock speed.

8. A processing system, comprising:
a memory having first, second and third sections;
an encoder configured to process data in each of the first, second and third memory sections, wherein the encoder reads a first data from the first memory section, processes the first data, and writes the first data back to the first memory section as a first encoded data;
an IFFT configured to read the first encoded data from the first memory section, process the first encoded data, and write the first encoded data back to the first memory section as a first IFFT processed data, concurrent to the encoder reading a second data from the second memory section, processing the second data, and writing the second data back to the second memory section as a second encoded data; and a post-processor configured to read the first IFFT processed data in from the first memory section and process the first IFFT processed data concurrent to the IFFT reading the second encoded data from the second memory section, processing the second encoded data, and writing the second encoded data back to the second memory section as a second IFFT processed data, and concurrent to the encoder reading a third data from the third memory section, processing the third data, and writing the third data back to the third memory section as a third encoded data, wherein the first, second, and third sections of the memory are reallocated between the encoder, the IFFT and the post-processor while processing the data, wherein each of the first, second, and third sections of the memory are shared exclusively by the encoder, the IFFT and the post-processor, wherein the encoder and the IFFT read from, and write to, the memory sections, and the post-processor reads from the memory sections.

9. The processing system, of claim 8, further comprising:
at least one multipurpose processor configured to implement at least one of the encoder, the IFFT, and the post-processor.

10. A processor coupled to a memory having first, second and third sections, the processor configured:
to process data to encode data in each of the first, second and third memory sections in a turn taking fashion, wherein the processor processing data to encode data comprises reading a first data from the first memory section, processing the first data, and writing the first data back to the first memory section as a first encoded data;
to IFFT process the encoded data in each of the first, second, and third sections in a turn taking fashion, wherein the processor IFFT processing the encoded data comprises reading the first encoded data from the first memory section, processing the first encoded data, and writing the first encoded data back to the first memory section as a first IFFT processed data, concurrent to the processor processing data to encode data by reading a second data from the second memory section, processing the second data, and writing the second data back to the second memory section as a second encoded data; and
to post-processor process the IFFT processed data in each of the first, second and third memory sections in a turn taking fashion, wherein the processor post-processor processing the IFFT processed data comprises reading the first IFFT processed data from the first memory section and processing the first IFFT processed data concurrent to the processor IFFT processing the encoded data by reading the second encoded data from the second memory section, processing the second encoded data, and writing the second encoded data back to the second memory section as a second IFFT processed data, and concurrent to the processor processing data to encode data by reading a third data from the third memory section, processing the third data, and writing the third data back to the third memory section as a third encoded data, wherein each of the first, second, and third memory sections alternately stores the encoded data and the IFFT processed data, wherein each of the first, second, and third memory sections are shared by the encode data process, the IFFT process and the post-processor process, wherein the encode data process and the IFFT process read from, and write to, the memory sections, and the post-processor process reads from the memory sections.

11. The processor of claim 10 coupled to the memory, wherein the memory having an additional fourth memory section, the processor configured:
to encode data in each of the first, second, third, and fourth memory sections in a turn taking fashion;
to IFFT process the encoded data in each of the first, second, third, and fourth sections; and
to post-processor process the IFFT processed data in each of the first, second, third, and fourth memory sections.

12. The processor of claim 11, wherein:
the post-processor processes the first and second memory sections as a first combined memory section, and the third and fourth memory sections as a second combined memory section.

13. The processor of claim 12, wherein:
the encoder processes the first and second memory sections as a first combined memory section, and the third and fourth memory sections as a second combined memory section.

14. The processor of claim 11, wherein:
the IFFT processes the first and second memory sections as a first combined memory section and the third and fourth memory sections as a second combined memory section, the IFFT sub-processes the memory sections of the combined memory sections concurrently.

15. The processor of claim 11, wherein:
the encoder, the IFFT, and the post-processor operate at the same clock speed.

16. A method comprising:
providing a memory having first, second and third sections;
processing data by encoding data in each of the first, second and third memory sections in a round robin fashion, wherein processing data by encoding data comprises reading a first data from the first memory section, processing the first data, and writing the first data back to the first memory section as a first encoded data;
IFFT processing the encoded data in each of the first, second, and third sections in a round robin fashion, wherein IFFT processing the encoded data comprises reading the first encoded data from the first memory section, processing the first encoded data, and writing the first encoded data back to the first memory section as a first IFFT processed data, concurrent to processing data by encoding data by reading a second data from the second memory section, processing the second data, and writing the second data back to the second memory section as a second encoded data; and
post-processor processing the IFFT processed data in each of the first, second and third memory sections in a round robin fashion, wherein post-processor processing the IFFT processed data comprises reading the first IFFT processed data from the first memory section and processing the first IFFT processed data concurrent to IFFT processing the encoded data by reading the second encoded data from the second memory section, processing the second encoded data, and writing the second encoded data back to the second memory section as a second IFFT processed data, and concurrent to processing data by encoding data by reading a third data from the third memory section, processing the third data, and writing the third data back to the third memory section as a third encoded data wherein each of the first, second, and third memory sections are shared by the encoding data processing, the IFFT processing and the post-processor processing, wherein the encoding data processing and the IFFT processing read from, and write to, the memory sections, and the post-processor processing reads from the memory sections.

17. The method of claim 16, further comprising:
providing a memory having a fourth section;
encoding data in each of the first, second, third, and fourth memory sections in a round robin fashion;
IFFT processing the encoded data in each of the first, second, third, and fourth sections; and
post-processor processing the IFFT processed data in each of the first, second, third, and fourth memory sections.

18. The method of claim 17, further comprising:
post-processor processing the first and second memory sections as a first combined memory section; and
post-processor processing the third and fourth memory sections as a second combined memory section.

19. The method of claim 18, further comprising:
encoding the first and second memory sections as a first combined memory section; and
encoding the third and fourth memory sections as a second combined memory section.

20. The method of claim 17, further comprising:
IFFT processing the first and second memory sections as a first combined memory section and the third and fourth memory sections as a second combined memory section;
IFFT sub-processing the memory sections of the combined memory sections concurrently.

21. The method of claim 17, wherein:
encoding, IFFT processing, and post-processor processing are processed at the same clock speed.

22. A processing system comprising:
a means for providing a memory having first, second and third sections;
a means for encoding data in each of the first, second and third memory sections in a round robin fashion, wherein the means for encoding data comprises a means for reading a first data from the first memory section, a means for processing the first data, and a means for writing the first data back to the first memory section as a first encoded data;
a means for IFFT processing the encoded data in each of the first, second, and third sections in a round robin fashion, wherein the means for IFFT processing the encoded data comprises a means for reading the first encoded data from the first memory section, a means for processing the first encoded data, and a means for writing the first encoded data back to the first memory section as a first IFFT processed data, concurrent to the means for encoding data further comprising a means for reading a second data from the second memory section, a means for processing the second data, and a means for writing the second data back to the second memory section as a second encoded data; and
a means for post-processor processing the IFFT processed data in each of the first, second and third memory sections in a round robin fashion, wherein the means for post-processor processing the IFFT processed data comprises a means for reading the first IFFT processed data from the first memory section and a means for processing the first IFFT processed data concurrent to the means for IFFT processing the encoded data further comprising a means for reading the second encoded data from the second memory section, a means for processing the second encoded data, and a means for writing the second encoded data back to the second memory section as a second IFFT processed data, and concurrent to the means for encoding data further comprising a means for reading a third data from the third memory section, a means for processing the third data, and a means for writing the third data back to the third memory section as a third encoded data, wherein the first, second, and third memory sections are exclusively shared by the means for encoding, the means for IFFT processing, and the means for post-processor processing, wherein the means for encoding and the means for IFFT processing read from, and write to, the memory sections, and the means for post-processor processing reads from the memory sections.

23. The processing system of claim 22, further comprising:
a means for providing a memory having a fourth section;
a means for encoding data in each of the first, second, third, and fourth memory sections in a round robin fashion;
a means for IFFT processing the encoded data in each of the first, second, third, and fourth sections; and
a means for post-processor processing the IFFT processed data in each of the first, second, third, and fourth memory sections.

24. The processing system of claim 23, further comprising:
a means for post-processor processing the first and second memory sections as a first combined memory section; and
a means for post-processor processing the third and fourth memory sections as a second combined memory section.

25. The processing system of claim 24, further comprising:
a means for encoding the first and second memory sections as a first combined memory section; and
a means for encoding the third and fourth memory sections as a second combined memory section.

26. The processing system of claim 23, further comprising:
a means for IFFT processing the first and second memory sections as a first combined memory section and a means for IFFT processing the third and fourth memory sections as a second combined memory section, the means for IFFT sub-processing the memory sections of the combined memory sections occur concurrently.

27. The processing system of claim 23, further comprising:
a means for encoding, IFFT processing, and post-processor processing at the same clock speed.

28. A non-transitory computer readable storage medium having a first, second and third sections, the computer readable storage medium containing a set of instructions for a processor to perform a method of IFFT processing by a transmitter, the instructions comprising:
a routine to encode data in each of the first, second and third memory sections in a round robin fashion, wherein the routine to encode data comprises a routine to read first data from the first memory section, a routine to process the first data, and a routine to write the first data back to the first memory section as a first encoded data;
a routine to IFFT process the encoded data in each of the first, second, and third sections in a round robin fashion, wherein the routine to IFFT process the encoded data comprises a routine to read the first encoded data from the first memory section, a routine to process the first encoded data, and a routine to write the first encoded data back to the first memory section as a first IFFT processed data, concurrent to the routine to encode data further comprising a routine to read a second data from the second memory section, a routine to process the second data, and a routine to write the second data back to the second memory section as a second encoded data; and
a routine to post-processor process the IFFT processed data in each of the first, second and third memory sections in a round robin fashion, wherein the routine to post-processor process the IFFT processed data comprises a routine to read the first IFFT processed data from the first memory section and a routine to process the first IFFT processed data concurrent to the routine to IFFT process the encoded data further comprising a routine to read the second encoded data from the second memory section, a routine to process the second encoded data, and a routine to write the second encoded data back to the second memory section as a second IFFT processed data, and concurrent to the routine to encode data further comprising a routine to read a third data from the third memory section, a routine to process the third data, and a routine to write the third data back to the third memory section as a third encoded data, wherein each of the first, second and third memory sections are exclusively shared by all of the routines, wherein each of the routines reads data from each of the first, second, and third memory sections, and each of the encode data and IFFT process routines write data to each of the first, second, and third memory sections.

29. The non-transitory computer readable storage medium of claim 28, medium further having a fourth section, wherein the transmitter is configured to:
encode data in each of the first, second, third, and fourth memory sections in a round robin fashion;
IFFT process the encoded data in each of the first, second, third, and fourth sections; and
post-processor process the IFFT processed data in each of the first, second, third, and fourth memory sections.

30. The non-transitory computer readable storage medium of claim 29, wherein the transmitter is configured to post-processor process the first and second memory sections as a first combined memory section, and post-processor process the third and fourth memory sections as a second combined memory section.

31. The non-transitory computer readable storage medium of claim 30, wherein the transmitter is configured to encode the first and second memory sections as a first combined memory section, and encode the third and fourth memory sections as a second combined memory section.

32. The non-transitory computer readable storage medium of claim 29, wherein the transmitter is configured to IFFT process the first and second memory sections as a first combined memory section and IFFT process the third and fourth memory sections as a second combined memory section, the IFFT sub-processes the memory sections of the combined memory sections concurrently.

33. The non-transitory computer readable storage medium of claim 29, wherein the transmitter is configured to encode, IFFT process, and post-processor process at the same clock speed.

* * * * *